Figure 1:
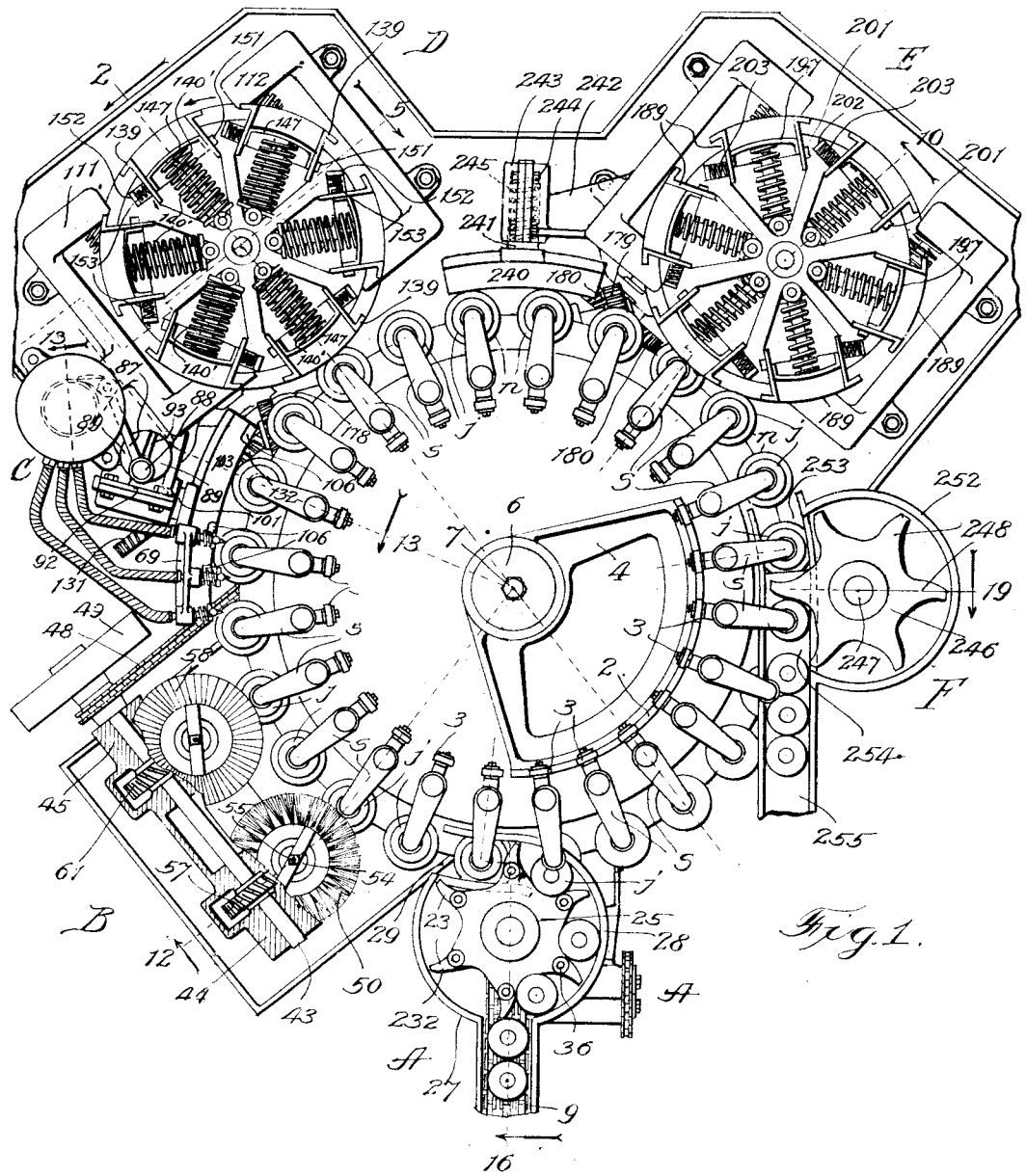

A. TIESSE.
LABELING MACHINE.
APPLICATION FILED APR. 10, 1913.

1,135,635.

Patented Apr. 13, 1915.
8 SHEETS—SHEET 1.

WITNESSES

INVENTOR
August Tiesse,
BY Poole & Cromer
ATTORNEY

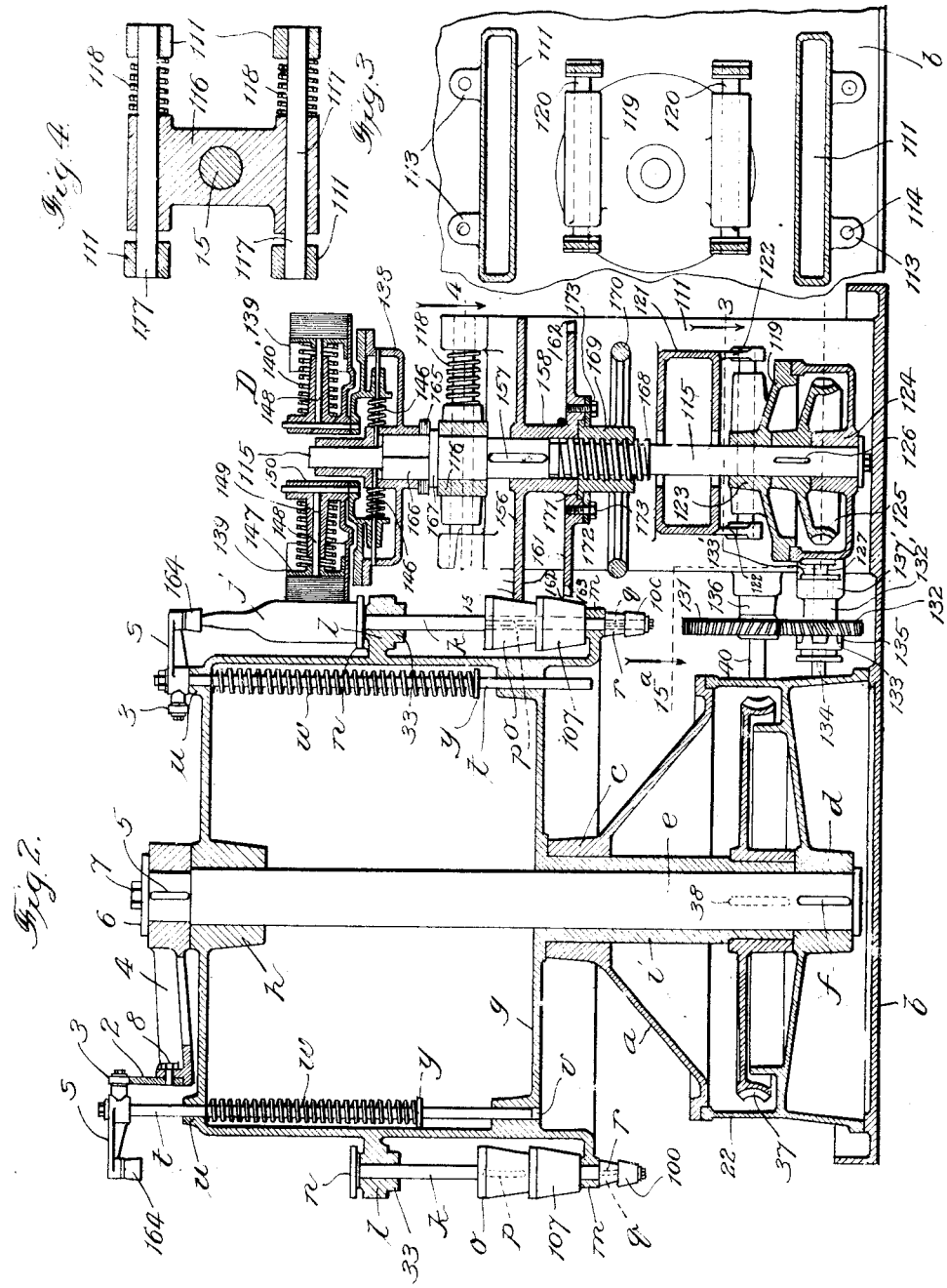

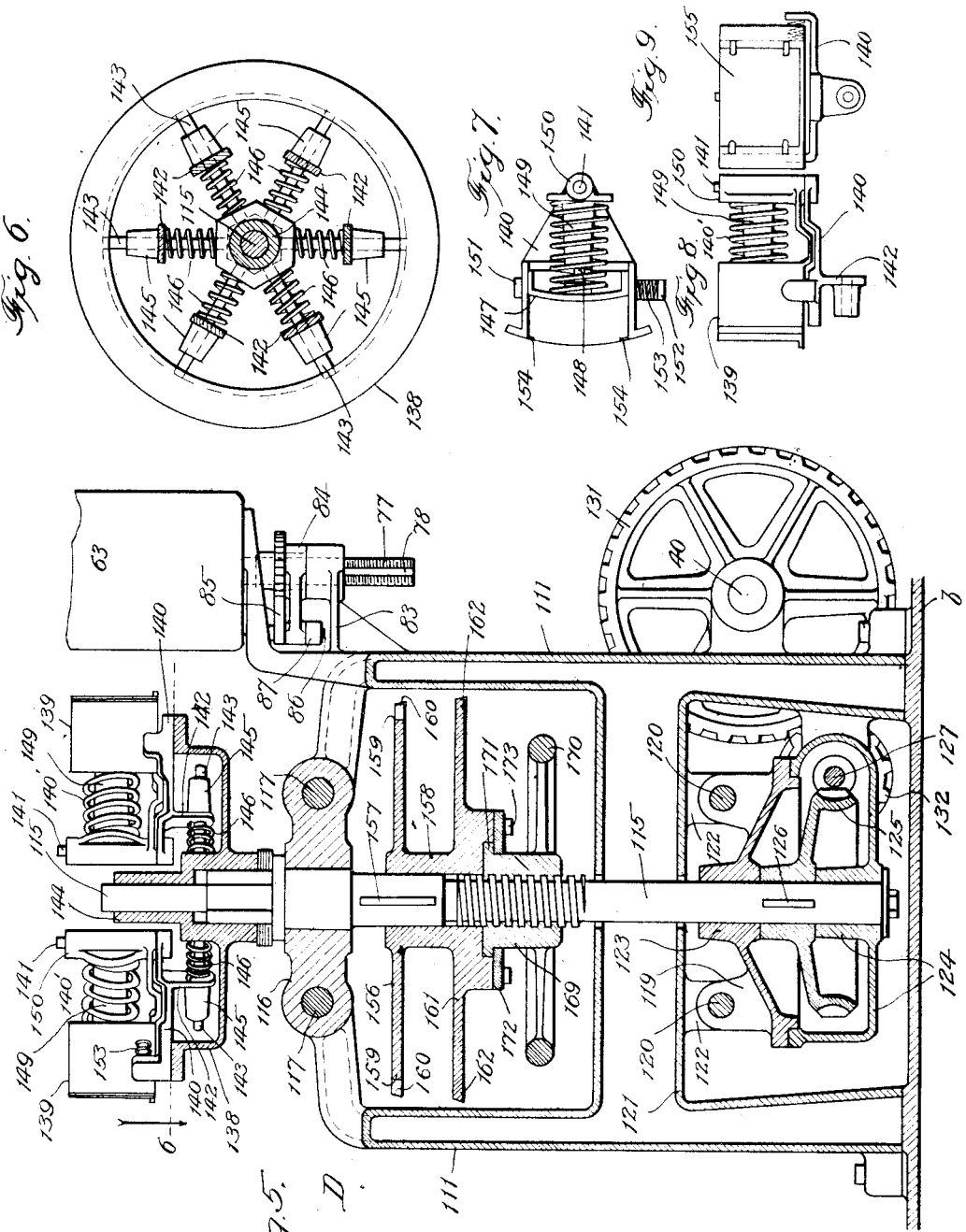

A. TIESSE.
LABELING MACHINE.
APPLICATION FILED APR. 10, 1913.
1,135,635.
Patented Apr. 13, 1915.
8 SHEETS—SHEET 4.
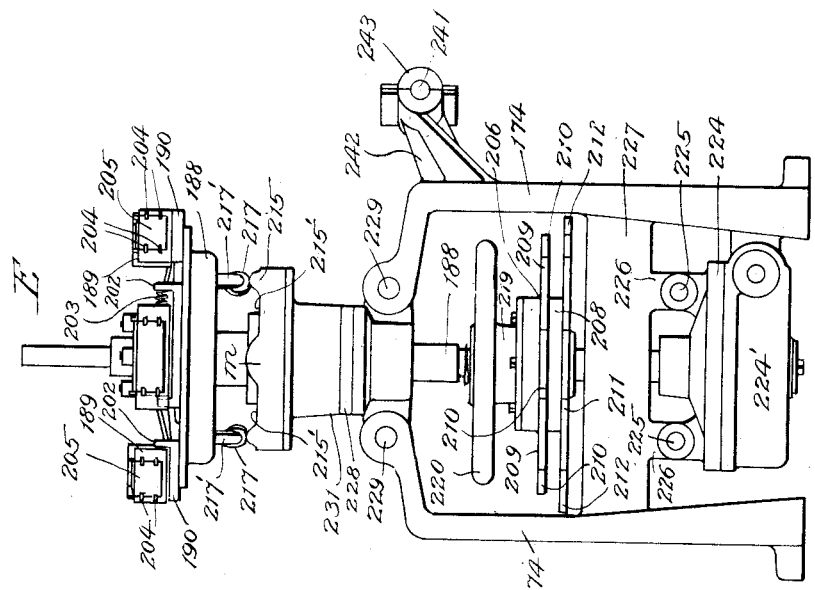
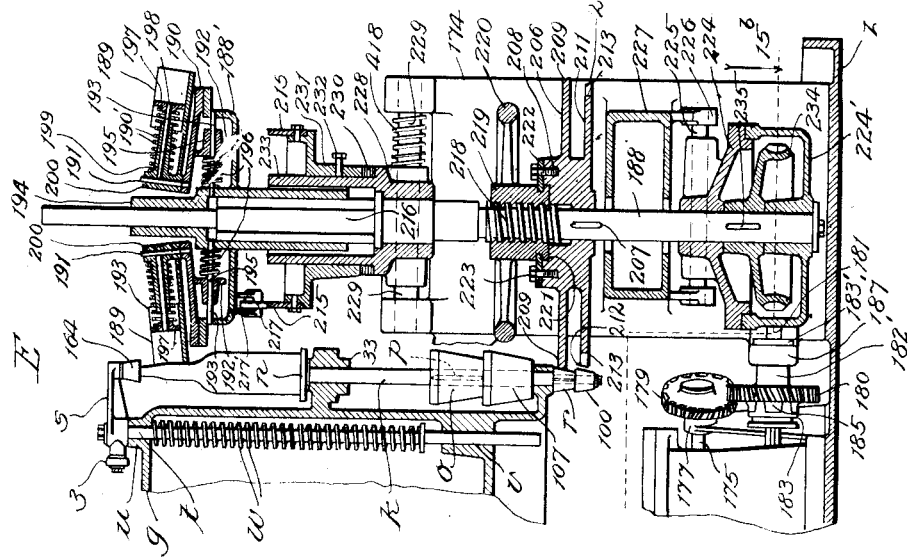
WITNESSES:
C. L. Peoples
Eugene C. Warn
INVENTOR.
August Tiesse,
BY Poole & Cromer
ATTORNEYS.

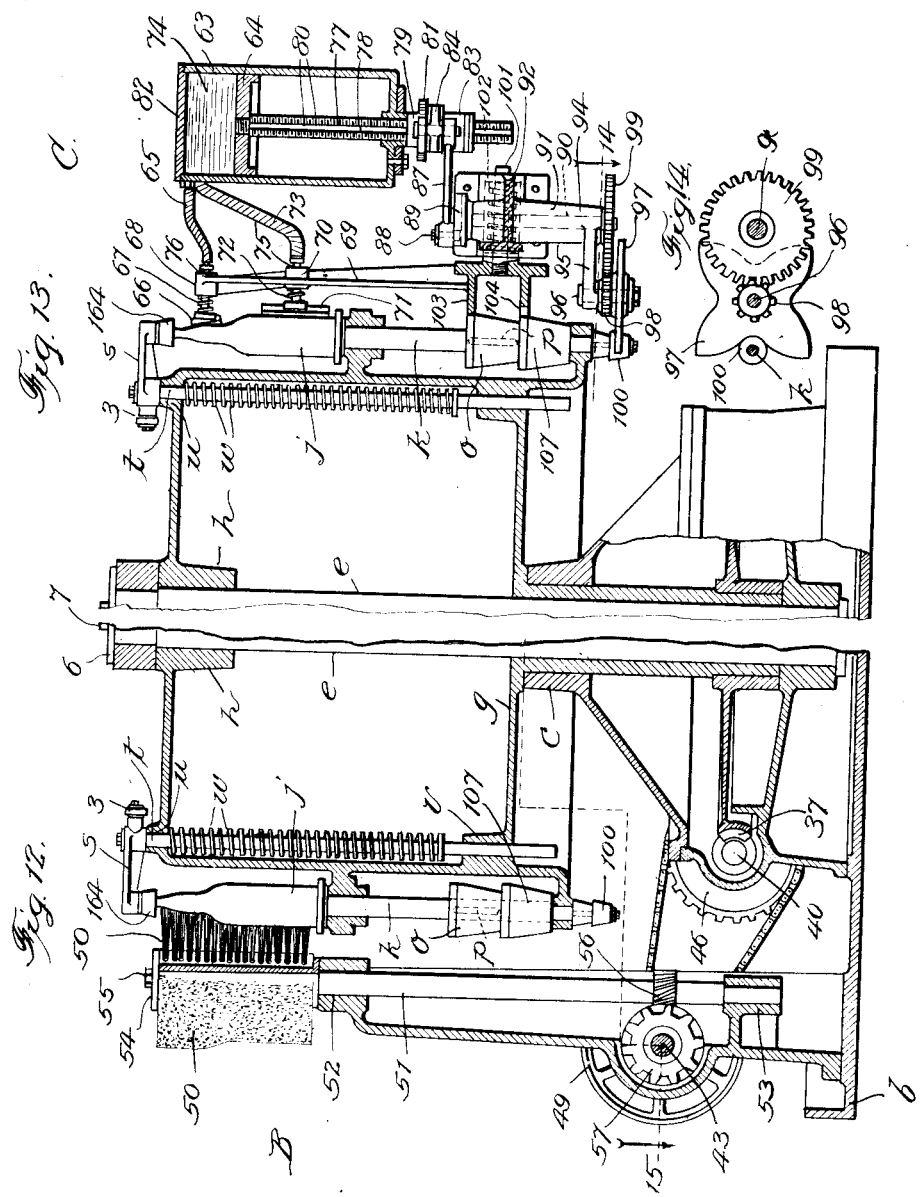

A. TIESSE.
LABELING MACHINE.
APPLICATION FILED APR. 10, 1913.

1,135,635.

Patented Apr. 13, 1915.
8 SHEETS—SHEET 6.

WITNESSES

INVENTOR
August Tiesse,
BY Poole & Cromer
ATTORNEY

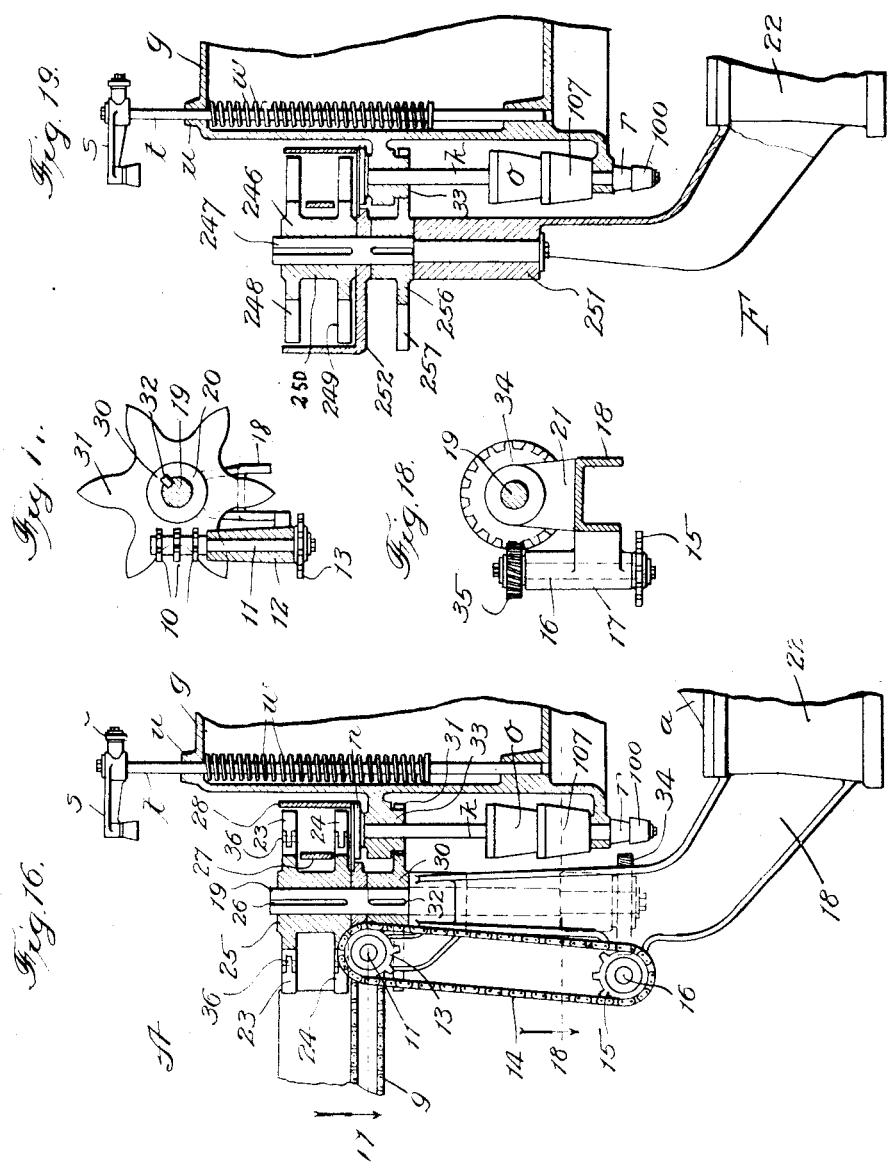

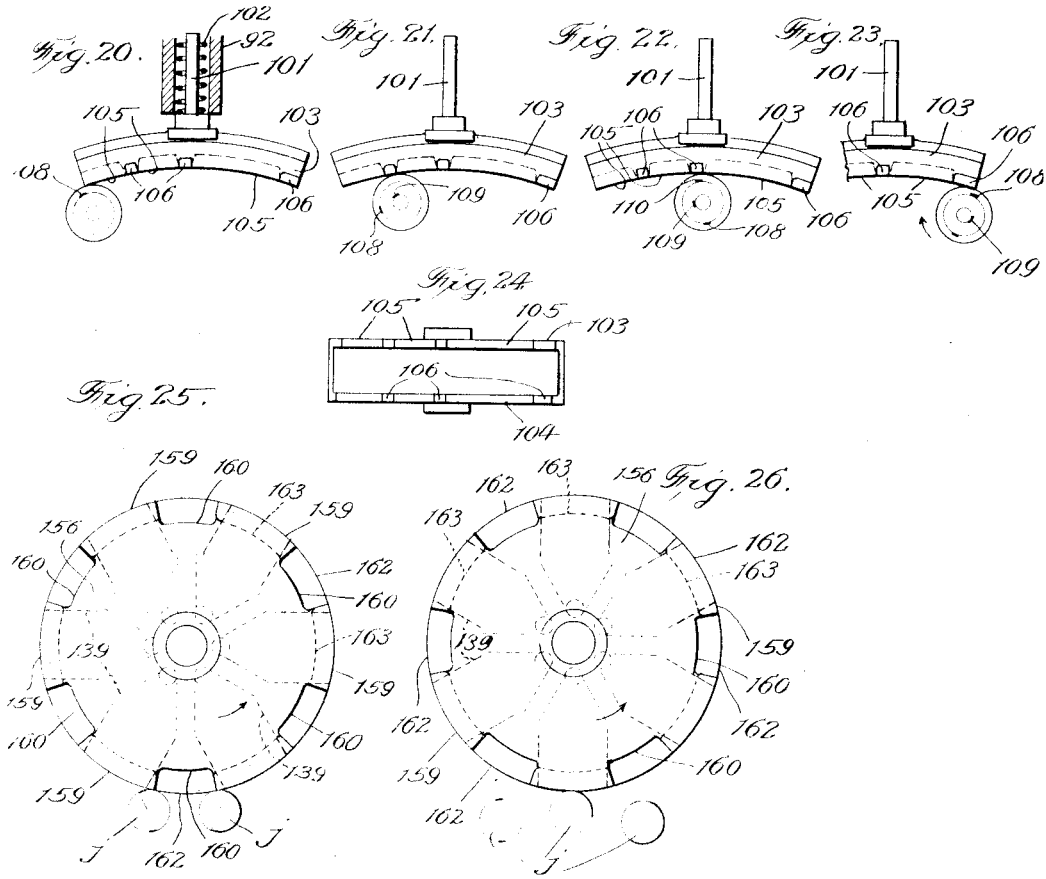

UNITED STATES PATENT OFFICE.

AUGUST TIESSE, OF CHICAGO, ILLINOIS.

LABELING-MACHINE.

1,135,635.  Specification of Letters Patent.  Patented Apr. 13, 1915.

Application filed April 10, 1913. Serial No. 760,279.

*To all whom it may concern:*

Be it known that I, AUGUST TIESSE, a citizen of the United States, and a resident of Chicago, in the county of Cook and State of Illinois, have invented certain new and useful Improvements in Labeling-Machines; and I do hereby declare that the following is a full, clear, and exact description thereof, reference being had to the accompanying drawings, and to the letters of reference marked thereon, which form a part of this specification.

This invention relates to an improvement in bottle-labeling machines.

It relates particularly to bottle-labeling machines which are adapted to present bottles successively and by continuous operation of the machine, in position to come into contact with the labels to be secured thereto, and to the means for supporting and feeding the labels into position to be attached to the bottle.

The principal object of the invention is to provide a simple, economical and efficient bottle-labeling machine.

Other and further objects of the invention will appear from an examination of the following description and claims and from an inspection of the accompanying drawings which are made a part hereof.

A bottle-labeling machine, constructed as herein shown and described, is adapted to present bottles successively in position to enable labels to be attached thereto, and to provide means for supporting and presenting the labels in position to come into contact with the bottles in the desired position while the bottles and the label receptacles are in motion, and in such a manner that the labels are secured in an efficient manner to a multiplicity of bottles successively and by a continuous operation of the machine.

A machine constructed as herein described comprises a series of label receptacles rotatably mounted or mounted upon a rotatable supporting member and adapted to be yieldingly held in position to present labels contained in a plurality of such label receptacles successively in position to enable the labels to be attached to the bottles in an efficient manner during the movement of the label receptacles and bottles, and is adapted to enable the receptacles to be removed, recharged or loaded, and replaced with facility, and to enable adhesive material to be applied to the proper surface portions of the bottles and the bodies and necks labeled after being cleaned, all by a continuous uninterrupted operation and while the bottles are in motion, thus enabling the operation to be accomplished with great speed and in an efficient manner.

The invention consists in the features, combinations, and details of construction herein described and claimed.

Figure 15:
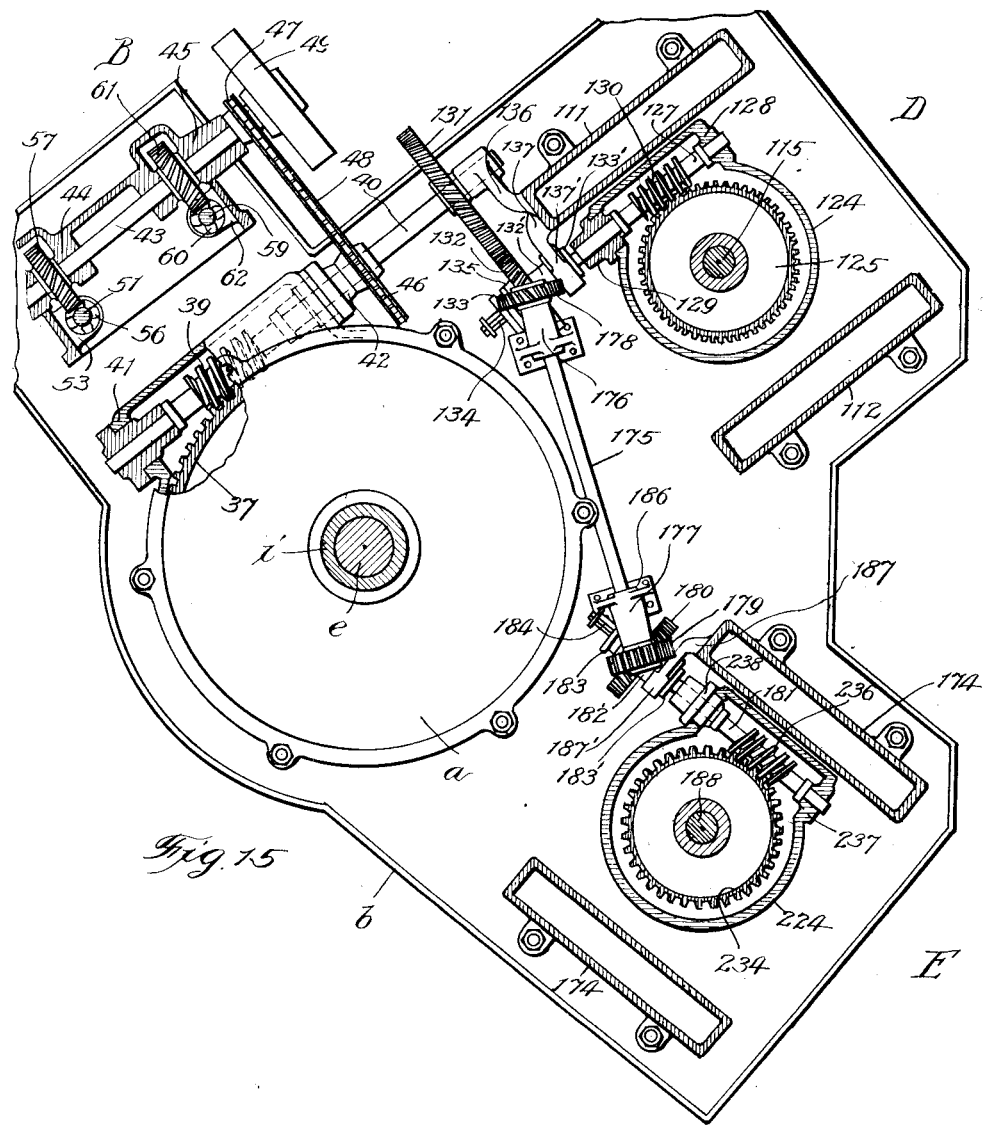

In the accompanying drawings—Figure 1 is a plan view of the bottle-labeling machine constructed in accordance with my invention and improvements; Fig. 2, a central vertical sectional view, taken on line 2 of Fig. 1 looking in the direction of the arrow; Fig. 3, a horizontal sectional view in detail, taken on line 3 of Fig. 2, and showing the lower supporting or yielding bearing or cross-head for the vertical shaft of the body-labeling mechanism; Fig. 4, a horizontal sectional view in detail, taken on line 4 of Fig. 2, and showing the upper supporting or yielding bearing for the vertical shaft or spindle of the body-labeling device; Fig. 5, an enlarged detail view in vertical section through the center of the vertical shaft of the body-labeling device, taken on line 5 of Fig. 1 looking in the direction of the arrow; Fig. 6, an enlarged horizontal sectional view in detail, taken on line 6 of Fig. 5 looking downward, and showing the means for supporting the rotary body-label receptacles; Fig. 7, an enlarged plan view in detail of one of the body-label receptacles or boxes, showing the spring for operating the label-feeding follower plate of the body label receptacle, and the spring for yieldingly holding said receptacle in operative position and adapted to permit limited rotative movement thereof; Fig. 8, a view in side elevation of the body label receptacle shown in Fig. 7, and showing the support for said receptacle; Fig. 9, a front or end view in elevation of the parts shown in Fig. 8; Fig. 10, a detail view in vertical section, taken through the center of the neck-labeling device on line 10 of Fig. 1 looking in the direction of the arrow; Fig. 11, a front view in elevation of the neck-labeling device as it would appear as seen from the lower right-hand corner of Fig. 1 looking diagonally across said figure; Fig. 12, a detail view in vertical section taken on irregular line 12 of Fig. 1 looking in the direction of the arrow, and showing the driving mechanism and rotary brush-operating mechanism for cleaning the bottles; Fig. 13, a similar view in vertical section taken approximately on irregular line 13 of Fig. 1 looking in the direction of the arrow, and showing the mechanism for applying adhesive material to the surface of the bottles; Fig. 14, a horizontal view in section, taken on line 14 of Fig. 13 looking downward, and showing the mechanism for operating the feeding mechanism, by means of which the adhesive material or paste is fed into contact with or applied to the surface of the bottles; Fig. 15, a horizontal sectional view, taken through the entire machine, showing the main driving mechanism for operating all of the movable parts of the machine, the driving mechanism illustrated in Fig. 12 being shown as it would appear taken on irregular line 15 of said figure; the driving mechanism for operating the body-labeling device shown in Fig. 2 being shown as it would appear taken on line 15ª of said figure, and the driving mechanism of the neck-labeling device shown in Fig. 10 being shown as it would appear taken on irregular line 15ᵇ looking in the direction of the arrow, and also showing the shaft and gear mechanism by means of which the driving mechanism of the body-labeling device and the neck-labeling device are connected and operated, and further showing the means whereby the rotary brushes for cleaning the bottles are operatively connected with the driving mechanism; Fig. 16, a detail view in vertical section through the center of the upper portion of the bottle-feeding device, taken on line 16 of Fig. 1 looking in the direction of the arrow, and showing the supporting bracket and driving sprocket and chain mechanism of the same in side elevation; Fig. 17, a horizontal sectional view in detail, taken on line 17 of Fig. 16, showing the main driving sprocket of the bottle-feeding device and the sprockets for supporting the chains by means of which the bottles are carried in being fed into the machine; Fig. 18, a detail view in horizontal section, taken on line 18 of Fig. 16, looking in the direction of the arrow, and showing the lower shaft and gear mechanism of the initial bottle-feeding device shown in Fig. 16; Fig. 19, a detail view in vertical section taken on line 19 of Fig. 1 looking in the direction of the arrow, and showing the means for automatically discharging the bottles from the machine; Figs. 20, 21, 22 and 23, detail plan views of the segmental friction cone-engaging members which coact with the friction cones or conical friction wheels during the operation of applying the adhesive to the bottles, Fig. 20 showing a bottle in the position which it would occupy upon the completion of the application of the first supply of adhesive for one margin of the body-label and at the moment when the friction cone for rotating the bottle first comes into engagement with the segmental cone-engaging member, Fig. 21 showing the bottle in the position which it would occupy with respect to the friction cone-engaging segment upon the completion of the application of the adhesive to the neck of the bottle for securing the neck label thereto, Fig. 22 showing the bottle in the position which it would occupy during or upon the application of the adhesive to the body of the bottle for securing the last or second margin of the label thereto, and Fig. 23 showing the bottle in the position which it would occupy after the application of the adhesive and immediately before coming into contact with the label; Fig. 24, a detail view in elevation of the segmental friction cone-engaging or bottle-rotating member or members shown in Figs. 20 to 23 inclusive; Fig. 25, a detail plan view of the bottle-controlling or rotary friction cone-engaging members of the body-labeling device shown in Figs. 2 and 5, showing one bottle in the position which it would occupy immediately before or upon first coming into contact with the body label to be applied thereto, and showing another bottle in the position which it would occupy to the right of the first-mentioned bottle upon the completion of the application of the body label thereto; and Fig. 26, a similar plan view of the parts shown in Fig. 25 with one bottle shown in the position which it would occupy before coming in contact with the label to be applied thereto, another bottle in the position which it would occupy during the application of the label thereto, and another bottle in the position which it would occupy after the completion of the application of a label thereto.

In constructing a bottle-labeling machine in accordance with my invention and improvements, I provide a stationary central supporting frame $a$ which is mounted by preference, upon a base $b$, the base $b$ here shown being adapted to form a supporting bottom or base for the entire machine. The central stationary frame $a$ forms an upper neck bearing $c$ and a lower stationary support $d$ for the standard or shaft which forms the axis around which the frame $a$ rotates, best shown in Fig. 2. An upright shaft or standard $e$ is supported by the central frame $a$ and central frame member $d$, being, by preference, mounted in fixed relation to the bottom-supporting portion $d$ to which it is rigidly secured by means of a key $f$, or in any desired, ordinary, or well known manner. A rotary main bottle-supporting frame or member, which is, by preference, in the form of a drum or annular rotary frame or body $g$, is provided with an upper bearing portion $h$ through which the upper end of the standard or stationary shaft $e$ extends, and with a depending hollow shaft or sleeve $i$ which surrounds the lower portion of the standard or shaft $e$ and is, by preference, secured in fixed relation to the main rotary frame or drum $g$, so as to rotate with the latter upon or around the shaft $e$— the upper neck bearing $c$ forming a suitable bearing for the sleeve $i$ and a support for the rotary frame or drum.

The main rotary or central bottle-supporting frame $g$ is provided with suitable means for removably supporting a plurality or multiplicity of bottles $j$ in such a manner that the bottles will be successively received from a suitable initial bottle-feeding device or mechanism A and presented successively in the order in which they are received, first in position to be operated upon or cleaned by the rotary brush and buffing or polishing wheel of a bottle-cleaning device or mechanism B, then in position to be operated upon or supplied with adhesive material or paste by means of a paste- or adhesive-applying device or mechanism C, then in position to be operated upon or to have a label applied to the body of the bottle, by means of a body-labeling device or mechanism D, then in position to have a label applied in a suitable manner to the neck of the bottle, by means of a neck-labeling device or mechanism E, and then removed from the machine or from the main rotative bottle-supporting frame or drum, by means of a bottle-discharging device or mechanism F, all by a continuous operation.

A machine embodying my invention, when constructed as herein described and illustrated, is adapted to enable the bottles to be first cleaned, then supplied with adhesive material for the body label and neck label, then with a body label applied to the body of the bottle, then with a neck label applied to the neck of the bottle, and then automatically discharged from the machine with the labels properly attached thereto. This machine also comprises means whereby each bottle may be caused to rotate upon its axis while in contact with the body label while the label receptacles are in motion and during the operation of attaching the labels, and means for preventing the rotation of each bottle upon its individual axis to the extent necessary in order to enable the desired surface portion of the bottle to be presented in position to receive the adhesive and in position to receive the body and neck labels in the proper order.

The rotative bottle-supporting frame or drum $g$ is provided with a series of bottle supports, which are, by preference, in the form of upright spindles $k$, which are arranged at suitable intervals in position to be supported by the main rotative body frame or drum $g$ in such a manner that each of the spindles $k$ is adapted to rotate upon its own axis with the bottle supported thereby, as well as to be carried around the axis of the supporting frame. Each spindle or vertical bottle-supporting shaft $k$ is, therefore, rotatably mounted in a suitable upper bearing $l$ and a suitable lower bearing $m$ which are in superposed relation to each other and supported by and in fixed relation to the frame $g$. Each spindle or shaft $k$ is provided at its upper end with a bottle-supporting plate or disk $n$ and at its lower portion with a friction cone or conical friction wheel $o$ secured in fixed relation thereto, by means of a key $p$, or other suitable means, by means of which the shaft is rotated during the operation of securing a label to the body portion of the bottle supported thereby. A similar conical friction member or driving member $r$ of smaller diameter is secured in fixed relation to the lower portion of the shaft, or spindle $k$, by means of a key $q$, or other suitable securing means, for enabling the shaft $k$ and thereby the bottle support upon the shaft to be rotated during the operation of applying the label to the neck of the bottle. An upwardly and downwardly movable bottle-engaging bracket arm $s$ is supported upon the main rotative frame $g$ in position to engage the upper end or mouth of a bottle supported by the corresponding spindle $k$ located directly beneath the outer bottle-engaging end of such bracket or arm, there being as many of these brackets or arms as there are bottle-supporting shafts $k$. Each bracket $s$ is supported by means of an upright shaft $t$, which is slidably mounted in suitable bearings or vertical openings $u$ and $v$ in the main rotative frame. These shafts are each held against rotation by being made angular in cross-section or are held non-rotatably in their supports by any ordinary means such as keys, or other similar, common and well known, or desired means. Each shaft $t$ is provided with a spring $w$ mounted with one end in engagement with a suitable support and with the opposite end in engagement with a collar or shoulder $y$ upon a shaft which may be encircled by the spring so that the shaft and thereby the corresponding bottle-engaging bracket or arm $s$ is yieldingly held down but removably in position to yieldingly engage and removably hold the bottle to be operated upon between the rotary cap 164 on the arm $s$ and the corresponding bottle-supporting disk $n$. A stationary segmental annular cam 2 is supported in position to engage the anti-friction rollers 3 upon the inner ends of the brackets or bottle-engaging arms $s$ in successive order during the rotation of the main rotative frame or bottle-supporting drum. This cam 2 is supported in fixed relation to the stationary standard $e$ to which it is secured by means of a supporting bracket 4 by means of a key 5, washer 6 and nut or bolt 7, or in any ordinary or well known manner, the outer end of the bracket arm 4 being secured in supporting engagement with the cam 2 by means of bolts 8, or by other suitable securing means. The segmental cam 2 is thus rigidly supported in stationary position and is adapted to raise the bottle-supporting bracket arms s out of engagement with the bottles, thus releasing the bottles successively when they come into position to be received by the discharging device F, so as to permit them to be discharged. The bracket arms s are thus held in raised position by the cam 2 during the operation of placing the bottles successively in position between the arms s and bottle-supporting disks n by the feeding mechanism, and are permitted to descend to lowered yielding bottle-engaging position when the arms s reach the proper position adjacent to the feeding device A and the releasing end of the cam 2.

Suitable feeding mechanism for automatically feeding the bottles into position to be engaged and supported by the rotative frame g, and which feeding mechanism may be of any desired, ordinary, or well known form, is provided (see Figs. 1, 16, 17 and 18). The feeding mechanism A shown in the drawings comprises in its construction a plurality of initial bottle-supporting feeding chains 9, shown in Figs. 1 and 16, which chains are mounted upon sprockets 10 which are in fixed relation to a rotary shaft 11 mounted in a suitable bearing 12 and provided with a driving sprocket 13, as shown in Fig. 17. The sprocket 13, which may be secured in fixed relation to said shaft in any ordinary or well known manner, is driven by means of a sprocket chain 14, the upper portion of which engages the teeth of said sprocket 13, and the lower portion of which is mounted in operative engagement with a similar toothed sprocket 15 which is mounted in fixed relation to a rotary shaft 16, said last-mentioned shaft being supported in a suitable bearing 17 (see Fig. 18). The bearing 17 and also the upper bearing member 12 (see Fig. 17) are each supported by and may form an integral part of the stationary supporting bracket 18, shown in Fig. 16. An upright spindle 19 (see Fig. 16) is rotatably supported with its upper end journaled in a suitable bearing 20 and its lower end journaled in a similar bearing member or bracket arm 21, both of said bearing members or bracket arms 20 and 21 being, by preference, integral with the bracket 18 already described. The bracket 18 is secured at its lower end to or may be integral with the annular portion 22 of the main central stationary frame a, as shown in Figs. 2 and 16. Mounted upon and in fixed relation to the upper end of the rotative spindle or shaft 19 is a bottle-feeding sprocket comprising an upper set of radial arms 23 and a lower set of radial arms 24 secured together by means of a central hub or body portion 25 through which the shaft 19 extends. The shaft 19 and sprocket or hub 25 are secured in fixed relation by means of a key 26, or other similar or suitable means. The radial arms 23 and 24 are adapted to admit bottles therebetween during the rotation of the shaft by which they are rotated, as the bottles are fed into position to be engaged by and admitted between said arms through the medium of initial feeding chains 9 already described. A stationary annular guide (see Figs. 1 and 16), comprising peripheral annular wall portions 27 and 28 surrounding the bottle-engaging sprocket and having an opening 29 between the ends thereof for permitting the bottles to pass from within said guide and from between the bottle-engaging arms 23 and 24, is adapted to hold the bottles between the arms 23 and 24 until released, in position to be fed into position between the bottle-engaging bracket arms s and bottle-supporting disks n, the bottles being allowed to pass from between the radial arms 23 and 24 when they are engaged between the arms s and supports n. An operating sprocket 30 having radial sprocket arms 31 is secured in fixed relation to the shaft 19 by means of a key 32 (see Figs. 16 and 17). The radial arms 31 of this sprocket correspond in number to the arms 23 and are arranged directly beneath the latter, each of the arms 31 being adapted to be engaged and operated by a peripheral projection or sprocket-engaging member 33 upon the main rotative frame g. The sprocket-operating member 33 may form a part of the peripheral projecting bracket or frame portion l. Mounted upon and in fixed relation to the lower end of the upright spindle 19 is a spiral gear wheel 34 (see Fig. 16), which is in toothed engagement with a similar gear or pinion 35 mounted upon the shaft 16 already described. It will thus be seen that the rotation of the main frame or drum g will cause the peripheral projection or sprocket-engaging and operating members 33 to pass into and out of engagement with the arms 31 of the sprocket 30, thus causing the bottle-engaging radial arms 23 and 24 to be rotated in such a manner that bottles fed into position therebetween will be brought in position to be supported upon the bottle-supporting disks n and between said disks and the brackets s, and that the bottles will be carried from between the sprocket arms 23 and 24 by the rotation of the frame or bottle-supporting drum g. The bottle-engaging sprocket arms 23 and 24 are, by preference, pivotally secured to the central portion or hub 25 of the bottle-feeding sprocket of which they form a part, by means of pivots 36, thus enabling the bottle-engaging arms 23 and 24 to yieldingly engage the bottles as they pass therebetween so as to prevent the bottles from becoming accidentally broken.

The main rotative bottle-supporting frame or drum $g$ is driven or rotated by means of a worm wheel 37 which is secured in fixed relation to the depending sleeve $i$ by means of a key 38, or other suitable securing means (see Figs. 2, 12 and 15). A worm 39 is secured in fixed relation to a rotative worm shaft or counter-shaft 40, which shaft is journaled in bearings 41 and 42. This worm is mounted in toothed engagement with worm wheel 37, on the sleeve $i$, and the shaft 40 is operatively connected with a main driving shaft 43 journaled in bearings 44 and 45 by means of a sprocket wheel 46 fixed to the shaft 40, a sprocket wheel or pinion 47 fixed to the rotative main driving shaft 43, and a sprocket chain 48 mounted upon and forming a connection between said sprockets. The main drive shaft 43 is provided with a driving belt pulley or wheel 49 which is adapted to be connected with a motor or other suitable source of power by means of a belt or any other ordinary or suitable connecting means (see Figs. 12 and 15).

It is desirable to provide means for cleaning and polishing the bottles before the adhesive material for securing the labels to the bottles is applied to the surfaces of the bottles (see Figs. 1, 12 and 15). A rotative brush 50 is therefore mounted in fixed relation to a vertical rotative shaft 51 which shaft is journaled in suitable bearings 52 and 53, the brush being removably secured to the upper end or upper portion of the shaft by means of a plate or washer 54 and a nut or other ordinary securing means 55. The upright spindle or shaft 51 is operatively connected with the worm shaft or countershaft 43, already described, by means of suitable gearing which, when constructed as shown in the drawings, is in the form of a spiral gear wheel or pinion 56 fixed to the shaft 51 and a spiral gear wheel 57 fixed to the shaft 43 and in toothed engagement with the gear 56 (see Figs. 12 and 15). A buffer wheel 58 is rotatably mounted in a similar manner, in a position to engage the surfaces of the bottles after they pass from the rotary brush 50. The buffer wheel is formed, by preference, of felt or other suitable buffing or polishing material and is mounted in fixed relation to a vertical shaft or spindle 59 which is operatively connected with the main driving shaft 43 by means of suitable gearing which, as shown in the drawings, comprises a spiral gear 60 fixed to the shaft 59 and a spiral gear 61 fixed to the shaft 43 and in toothed engagement with the gear 60 (see Fig. 15).

This gearing is similar to or identical with the gearing by means of which the shaft 51 is connected with the shaft 43 and driven (see Fig. 15). The shaft 59 is journaled in suitable bearings 62, shown in Fig. 15.

The means for enabling adhesive material or paste to be applied to the surfaces of the bottles before the labels are secured thereto may be of any desired, ordinary, or well known form (see Figs. 1, 5, 13 and 14). A very efficient device for this purpose, however, is shown in the drawings consisting of a paste receptacle or adhesive-containing vessel 63 which is in the form of a cylindrical casing forming a piston chamber in which is slidably mounted a piston 64 for forcing paste or adhesive material from the chamber through an outlet passage 65 and nozzle 66 onto the surface of the necks of the bottles, and through nozzle 71 onto the surface of the body portions of the bottles, as they are successively presented in position to receive the adhesive material from the nozzles. The nozzle 66 is held in position to yieldingly engage the necks of the bottles by means of a spring 67 and is slidably supported in a suitable bearing 68 upon a bracket 69 (see Fig. 13). This bracket 69 is also provided with a bearing 70 in which a similar but larger nozzle 71 is slidably supported and held in position to yieldingly engage the surface of the body of the bottle, by means of a spring 72, the nozzle 71 being connected with a flexible tube 73 which forms a discharge passage leading from the paste-containing chamber 74 of the receptacle or casing 63 to the nozzle 71. The nozzle 71 is provided with a tube or neck portion 75 which extends through the bearing 70 and forms a connection between the nozzle and the pipe 73 (see Fig. 13), and the nozzle 66 is provided with a similar tube 76 in fixed relation thereto and which is slidably supported in the bearing 68 and connected with the flexible pipe 65 forming a connection between said pipe and said nozzle 66. The nozzles 66 and 71 are each provided with an elongated opening or any desired number of discharge openings adapted to supply a suitable quantity of adhesive material for coating the desired portions of the surfaces of the bottles as the bottles are successively presented in position to receive the adhesive material. The piston 64 is automatically operated by means of suitable mechanism, which may be of any desired, suitable, or ordinary form; but, when constructed as shown in the drawings, comprises a non-rotative threaded screw 77 secured in fixed relation to the piston and extending downward through the lower head or end of the casing 63, and held against rotation by means of an elongated peripheral slot 78 in said screw adapted to slidably engage a stationary spline or key so as to be held against rotation thereby. A threaded nut or sleeve 79, which may be in the form of a sleeve having inner screw threads adapted to engage the screw threads 80 of the non-rotative screw 77, is mounted in threaded engagement with the latter on the outside of the casing 63, and is provided with a ratchet, or ratchet toothed portion 81 by means of which the nut or threaded sleeve 79 is adapted to be rotated in a step-by-step manner. The upper end of the nut or sleeve 79 being in engagement with the bottom surface of a stationary member, such for instance as the bottom of the casing 63, it will be readily seen that the rotation of the nut or sleeve 79 in one direction will cause the piston to move upward so as to force adhesive material out of the chamber 74 and through the nozzles 66 and 71, and its rotation in the opposite direction will cause the piston to move downward or in the direction of its initial position, so that the reservoir may be filled. The casing being provided with a cover 82 forms a tight chamber, and the feeding of the adhesive material from the chamber may be controlled and regulated by controlling or regulating the operation of the nut or sleeve 79 and thereby the extent of movement of the piston 64. A bracket arm 83, shown in Figs. 5 and 13, extends beneath the nut or rotative threaded sleeve 79 and encircles the lower portion of the non-rotative screw 77, and a link or pawl-supporting rocking member 84 encircles the screw 77 below and adjacent to the ratchet 81, and is supported by the bracket 83. A pawl 85 is pivoted upon the outer end of the reciprocating rotative arm or link 84 by means of a suitable pin 86 (see Fig. 5), and is thus supported in position to engage the ratchet teeth of the ratchet 81. An operating connecting rod or pitman 87 has its outer end pivotally secured to the pawl-operating lever or arm 84 by means of the pivot pin 86 already described, and its opposite end is mounted upon a crank pin 88 which is adjustably supported upon a grooved head or crank disk portion 89 of an upright crank shaft 90 which is journaled in suitable bearing portions 91 of a stationary supporting bracket 92 (see Figs. 1 and 13). The crank pin 88 is adjustably supported in the head or crank disk 89 by being slidably mounted in a transverse slot 93 which extends across the face of the disk 89, as indicated in Fig. 1, so as to permit the crank pin 88 to be adjusted and firmly secured in any desired adjusted position with respect to the axis of the crank disk 89. The length of the stroke of the connecting rod or pitman 87 and of the pawl operated thereby may thus be regulated by moving the crank pin inward toward the axis of rotation to reduce the length of the stroke and outward to increase the length of the stroke.

The stationary bracket 92 has a depending portion 94 which forms the journal bearing for the shaft 90, already described, and is provided with a laterally projecting bracket arm 95 (see Fig. 13) which is provided with a vertical stub shaft 96 upon which is rotatably mounted a sprocket 97, and a spur pinion or gear wheel 98, which is in fixed relation to the sprocket 97, is rotatably mounted upon the stub shaft 96 and in toothed engagement with a spur gear 99 which is fixed to the lower end of the rotary crank shaft 90 (see Figs. 13 and 14). The sprocket 97 is supported in position to admit, between the arms or teeth thereof, cone-shaped idler or anti-friction members 100, or any suitable laterally projecting peripheral sprocket-operating members supported by and adapted to move with the main rotative bottle-supporting frame or drum g. There are as many of these sprocket-engaging members or cone-shaped idlers 100 as there are bottle supports upon the periphery of the main rotative bottle-supporting frame or drum g, so that the sprocket 97 is operated one step by each peripheral operating member or idler 100, or one step for each bottle operated upon, as the idler members are successively brought into position to engage and operate the sprocket member 97 and thereby the piston 64 through the medium of the shaft and gear mechanism and pawl and ratchet mechanism above described.

The bracket arm 69 which supports the nozzles 66 and 71, and the bottle-rotating segment 103 at the base of the arm 69, are slidably supported in the stationary bracket 92, as indicated in Fig. 13, the lower portion of the bracket 69 being provided with a horizontal projection 101 which is slidably mounted in a suitable similarly shaped opening in the stationary bracket 92 (see Figs. 1 and 13), and a compressible spring 102 is mounted in position to encircle the horizontal sliding bracket arm 101, so as to yieldingly hold the bracket 69 and nozzles 66 and 71 in position to enable the nozzles to yieldingly engage the bottles during the process of applying the adhesive material or paste thereto (see Figs. 1 and 13). A stationary upper yielding segmental bottle-rotating member or shoe 103, above mentioned, and a similarly shaped segmental guide or positioning member 104, are mounted in superposed relation to each other and preferably fixed to or integral with the bracket arm 69 and the horizontal shank or supporting member 101, already described. The segmental member 103 is adapted to engage each of the conical friction members or bottle-rotating members o successively as the latter come into position to be engaged by the inwardly projecting segmental portions 105 of said member 103 and caused to rotate upon their axes, thereby rotating the shafts $k$ and the bottles supported thereby, successively. The bottles are thus rotated upon their axes while in engagement with the members 103, but during the intervals when the members $o$ are not engaged by the members 103 but are passing the latter said members $o$ are permitted to move with the main bottle-supporting frame or drum $g$. The segmental bottle-rotating member 103 is provided with a series of inwardly extending segmental portions 105, as indicated in Figs. 20 to 24 inclusive, each adapted to engage the periphery of the conical friction members $o$ so as to cause the corresponding bottles to rotate during such engagement, and the lower segmental positioning member or segmental guide 104 is provided with a series of similar but shorter inwardly extending or projecting segmental portions 106 which are in staggered relation to the friction cone-engaging members 105 or directly beneath the spaces between the segmental portions 105 of member 103 and are adapted to engage the conical idler members 107, when the members $o$ are not engaged by the segmental portions 105. It will be noted that the conical members 107, of which there is one for each shaft $k$ and which are mounted directly beneath the members $o$ already described and correspond with the latter in size and shape, are not fixed to the shafts $k$ but, on the contrary, are adapted to rotate freely thereon or to permit the free rotation of the corresponding shafts. It follows as a matter of course that when the conical friction members $o$ are in such position that they are not in engagement with the inner conical portions 105 of the segmental member 103 while passing the latter, the idler conical members 107 will be in engagement with the inner segmental portions 106 of the lower positioning member 104, so that each bottle will be permitted to move with the drum $g$ without rotating upon its axis during the intervals in which the members 107 and 106 are in engagement, or, in other words, during the intervals when the parts 105 of the upper segmental member 103 are out of engagement with the conical members $o$. The bottles may thus be caused to rotate upon their axes in such a manner as to bring the desired portion of the bottle into position to receive the adhesive material and may be permitted to move with the main rotative frame $g$ without rotating upon their axes during the application of the adhesive material or during the intervals when the members $o$ and 103 are out of contact with each other.

In Fig. 20 a bottle is shown in the position which it would occupy upon first coming in contact with an inner segmental portion 105 of the upper or bottle-rotating member 103 immediately after or during the completion of the first application of adhesive material 108 to the body of the bottle. Fig. 21 shows the bottle in the position which it would occupy during the completion of the application of the adhesive 109 for the neck label. Fig. 22 shows the bottle in the position which it would occupy during or upon the completion of the second application of adhesive material 110 to the body of the bottle. And Fig. 23 shows the bottle in the position which it would occupy after the completion of the application of the adhesive thereto. The portion of the adhesive, indicated by the numeral 108, which was first applied to the body of the bottle, is shown in Fig. 23 in a position which would enable it to be brought into contact with a label upon continuing the movement of the drum $g$ with the bottle carried thereby, but a segmental bottle-rotating member or shoe 250, hereinafter described and which is similar to the bottle-rotating member 103 already described, serves to rotate the bottles on their axes to the proper position with respect to the neck label device E. It will be readily seen that by raising the members 103 and 104 with respect to the conical members $o$ and 107 the nozzles will be enabled to be held at a greater distance from the axial center of the main bottle-supporting frame or drum $g$ than if said members are lowered so as to engage a relatively small peripheral portion of the conical members $o$ and 107, respectively. The diameter of the surface portions of the members $o$ and 107 thus caused to be engaged by the members 103 and 104, respectively, correspond with the diameters of the bottles. The position of the nozzles may thus be changed as required by the varying sizes or diameters of the bottles to be operated upon.

The device or mechanism by means of which the labels are supported in position and pressed against the peripheral surfaces of the bodies of the bottles, as the bottles are successively presented in position to receive the labels, therefore, is constructed as follows: Upright frame portions 111 are mounted upon a suitable base, such as the base $b$ already described, to which they are secured in any desired, ordinary or well known manner as by means of lugs 113 having apertures 114 therein for receiving securing bolts or studs adapted to securely hold the upright frame portions rigidly in position (see Figs. 1, 2, 3 and 5). An upright spindle or shaft 115 is rotatably mounted in laterally movable cross-heads or bearing members. The upper transversely movable bearing member or cross-head 116 (see Figs. 2, 4 and 5) is slidably mounted upon parallel horizontal shafts or stationary supporting and guiding members 117 which extend through suitable horizontal apertures in the cross-head, as shown in Figs. 4 and 5, and a compressible spring 118 (see Fig. 2) encircles each of these stationary supporting members or shafts 117. One end of each of the springs 118 engages a stationary frame portion or abutment 111 and its opposite end engages a cross-head 116 so as to exert a yielding pressure upon the cross-head tending to press the upper portion of the shaft or spindle 115 and the label receptacle supported thereby in the direction of the axis of the main bottle-supporting frame or drum $g$. The lower portion of the shaft or spindle 115 is journaled in a similar laterally movable or sliding bearing member or cross-head 119 which is slidably supported upon parallel horizontal shafts or supporting and guiding members 120 which are parallel with and below the level of the guiding members 117, already described. The bottom member or cross-head 119 is thus adapted to move inward toward the axial center of the main bottle-supporting frame or drum $g$ and outward therefrom upon the horizontal shafts or stationary guiding and supporting members 120, the latter being supported upon a suitable stationary frame portion 121 having depending arms or stationary frame portions 122 in which the opposite ends of the horizontal shafts 120 are supported. The head 119 is provided with a central bearing 123 and a bottom bearing 124, in which the shaft 115 is journaled. The bearing 124 is located below the bearing 123, and said bearing 124 is supported by the head 119. Said bearing 123 supports a worm wheel 125 which is secured to the shaft 115 by means of a key 126, or by any similar or suitable securing means. (See Figs. 2, 5 and 15.)

A horizontal worm shaft 127 journaled in bearings 128 and 129, shown in Fig. 15, which are supported by or in fixed relation to the bottom bearing member 124 or the laterally movable head 119 of which the bottom bearing member 124 forms a part, is provided with a worm 130 in fixed relation to said rotative shaft 127 and in toothed engagement with the worm wheel 125 already described (see Figs. 2, 5 and 15). The shaft 127 is operatively connected with the shaft 40 already described, by means of suitable gears which, when constructed as shown in the drawings, comprises a spiral gear wheel 131 mounted upon and in fixed relation to the shaft 40 and a spiral gear wheel or pinion 132 mounted upon the worm shaft 127 (see Fig. 15), preferably in such a manner as to permit the longitudinal movement of the shaft 127 with respect to the gear wheel 132. The gear wheel 132 is operatively connected with the shaft 127 by means of a movable clutch member 133 which is slidably mounted upon the shaft 127. The clutch member 133 is connected with said shaft by means of a key or spline 134 which is adapted to engage a slot in the clutch member 133. The clutch member is thus adapted to be moved longitudinally of the shaft 127 to the position shown in Fig. 15, in which position the jaws of the movable clutch member are held in clutching engagement with the jaws of the clutch member 135 which is fixed to the gear wheel 132, thus forming such a connection between said gear wheel and the shaft 127 as to cause them to rotate together when so connected. The movement of the clutch longitudinally of the shaft 127 in a direction away from the gear 132 and clutch member 135 will of course release the clutch members from clutching engagement with each other, and permit the free rotation of the gear wheel 132 with respect to the shaft 127. The gear wheel 132 has a shank or sleeve 132' which may be integral with the wheel, and this sleeve or elongated hub encircles the shaft 127 and is rotatable in a bearing 137' on the bracket arm 137 and is provided with a lateral end flange or collar 133' for preventing the movement of the wheel 132 longitudinally of its axis. The outer end of the shaft 40 is journaled in a suitable bearing in a bracket arm 136 and the worm shaft 127 has its inner end portion encircled by the sleeve 132' and the bearing 137 on a similar stationary bracket arm 137, said arms being supported by or forming an integral part of the upright frame portion 111, as shown in Fig. 15. It will thus be seen that by merely operating the movable clutch member 133 manually or by mechanical means which may be of any ordinary or well known form, the rotative worm shaft 127 of the body-labeling device D may be operatively connected with the source of power or driving mechanism, or disconnected therefrom, as desired.

Mounted upon and in fixed relation to the upper portion or end of the shaft 115 is a head or supporting frame 138 (see Figs. 2, 5 and 6) which forms a rotative support for a series of laterally movable pivoted label receptacles or boxes 139. Each box or label receptacle 139 is pivotally secured to and supported by a transversely movable box-supporting member 140, by means of a vertical pivot 141 which projects upward from and is supported by the inner end of the sliding box-supporting member 140. Each box-supporting member 140 has a depending arm portion or boss 142 which may form an integral part of the member 140. A radial guiding rod 143, having its inner end secured to and supported by the hub portion 144 of the head 138 and its outer end supported by the outer peripheral portion of the head 138, extends beneath each slidable label box-supporting member 140 and through a bearing member 142 having a horizontal aperture therethrough, for receiving such guiding rod. Each of the depending arms or guiding members 142 is provided with a radial boss or stud 145 which is integral therewith and through which a corresponding guide rod 143 extends. A compressible spring 146 encircles each guide rod 143. The inner end of each spring 146 is in engagement with the hub 144, the outer end of each spring being in engagement with the depending portion or guiding member 142 of the transversely slidable label box-supporting member 140. Each spring 146 is thus adapted to press the corresponding transversely movable box-supporting member 140 outward radially with respect to the axis of the shaft 115 and with it the corresponding label receptacle 139 and the pivot pin 141 which pivotally connects the label receptacle 139 with its transversely slidable support 140 (see Figs. 2, 5, 6 and 9). Each label box or receptacle 139 is provided with a label-feeding member, diaphragm or piston 147 (see Figs. 2 and 7). Each label feeding member or plate 147 is provided with a guiding shank or stem 148 in fixed relation thereto or integral therewith and extending into a radial aperture in the radial horizontal boss or guiding stud 149 which may form an integral part of the hub 150 of the corresponding label receptacle or box 139 and through which hub extends the vertical pivot 141 which pivotally connects the label receptacle with its slidable supporting member 140. A compressible spring 140' for each label receptacle 139 is mounted in position to encircle the shank 148 of the corresponding label-feeding plate 147 and also in position to encircle the corresponding horizontal boss 149 so as to yieldingly press the label-feeding plate 147 laterally or in the direction of the discharge opening of the corresponding label receptacle 139, thus feeding the labels contained in the receptacle into position to be successively attached to the bottles as they are presented in position to receive labels.

The label receptacles or boxes 139 are adapted to be readily removed and recharged and replaced independently of one another. Each supporting member 140 is provided with an upwardly projecting lug or finger 151 located on one side of the corresponding label receptacle or box 139 and with a similar upwardly projecting lug 152 in fixed relation to or integral with the member 140 and located on the opposite side of the label receptacle 139, and a compressible spring 153 is mounted between the lug 152 and the adjacent side of the label receptacle 139 and is adapted to yieldingly hold the latter normally in engagement with the lug 151, and to permit the movement of the receptacle 139 upon its pivot 141 and against the tension of the spring 153 when a bottle of comparatively large diameter is presented in position to engage the outermost label contained in the label receptacle or box. Each receptacle or box 139 is provided with lugs 154 extending inward from the opposite margins or side walls of the box at the opposite marginal edges of the open end or label-discharging mouth of the latter and in position to engage the marginal edges of the labels 155 in such a manner as to hold the outer label in position and permit the labels to be successively attached to the bottles as the latter pass into position to receive the same from the label receptacles or boxes 139 (see Figs. 7 and 9).

The shaft 115 upon which the body label receptacles 139 are supported, is provided with a bottle-rotating member or segmental friction wheel 156 which is connected with the shaft by means of a key or spline 157 and a hub 158 in such a manner as to rotate with the shaft but permit the member 156 to be adjusted upwardly or downwardly longitudinally of the shaft. This bottle-rotating member or wheel 156 is provided with a multiplicity of segmental peripheral portions 159 which project outward beyond the intermediate peripheral portions 160, as indicated in Fig. 25, into position to engage the peripheries of the conical friction members or bottle-rotating members o which are keyed to the vertical spindle k upon which the bottles to be operated upon are supported. A similar positioning member 161 which may be mounted upon or may be integral with the member 156, with which it is connected by means of the hub 158, as shown in Figs. 2 and 5, is mounted, by preference, directly below the bottle-rotating wheel or member 156 and in fixed relation to the latter. This positioning member 161 is provided with a series of peripheral portions 162 which project laterally beyond the intermediate peripheral portions 163 and into position to engage the peripheries of the conical idler members 107 which are mounted upon and rotate with respect to the shafts k, as already described. The laterally projecting peripheral portions 162 of the positioning member 161 are in staggered relation to the similar projecting peripheral portions 159 of the bottle-rotating wheel 156 or directly beneath the space between said segmental portions 159. They thus engage the peripheral surfaces of the members 107 so as to hold the shaft 115 and the labeling mechanism, supported by said shaft in proper position with respect to the bottles j, or, in other words, in proper position with respect to the axis of the main bottle-supporting frame or drum g when the bottle-rotating wheel 156 is not in engagement with any conical bottle-rotating member or conical friction wheel o. The recesses between the outwardly projecting peripheral portions 162 of the positioning member 161 permit the idler members 107 to move freely along without engaging the member 161 when the conical members o are in engagement with the bottle-rotating member 156. By the above arrangement it will be seen that the segmental peripheral portions of the bottle-rotating member 156 are adapted to engage the conical bottle-rotating members o successively and thereby cause the bottles supported upon the corresponding shafts or vertical spindles k to be rotated in the direction indicated by the arrows in Figs. 25 and 26, while in engagement with the labels during the operation of attaching the latter to the bottles. The shaft 115 is held against the tension of the springs 118 or outward in proper position during the intervals of time in which the bottles upon the corresponding shafts k are not being rotated by the bottle-rotating members 156 and o. The rotation of the bottles with the corresponding shafts or spindles k is facilitated by providing a rotary depending cap 164 which is rotatably mounted in the outer end of each bracket arm s already described.

It is of course desirable to provide means whereby the body label receptacles may be raised or lowered as required by reason of the varrying sizes or lengths of bottles to which labels are to be attached. An annular filler plate or collar 165 is, therefore, mounted in position to encircle the angular portion 166 of the shaft 115 and rest upon a collar 167 on said shaft. This annular filler plate or removable collar 165 may be of any desired thickness and is adapted to be removed and replaced by another of a greater or less thickness, as desired, so as to enable the label receptacles to be adjusted upwardly or downwardly to any desired adjusted position and supported in any position to which they are adjusted. In order to enable the bottle-rotating member or wheel 156 and the positioning member 161 to operatively engage the conical members o and 107, respectively, at points upon the peripheries of said conical members where the diameter of the part of the conical member engaged will correspond with the diameter of the bottles to be operated upon, it is desirable to provide means whereby the bottle-rotating member 156 and positioning member 161 may be adjusted upwardly or downwardly with respect to the members o and 107. The shaft 115, is, therefore, provided with a screw 168, and a sleeve or nut 169 having an inner screw thread in threaded engagement with the screw 168 encircles the screw and is, by preference, provided with an operating hand wheel 170 for rotating the nut or sleeve. The nut or sleeve has an annular flange 171 at its upper end, and an annular plate or washer 172 is secured, by means of bolts 173, in position to engage the inner side of the flange 171 and support the nut so that the rotation of the nut or threaded sleeve 169 in one direction will raise the segmental bottle-rotating member or wheel 156 and the segmental positioning member 161, and the rotation of the nut in the opposite direction will lower said members. The members 156 and 161 will thus be raised or lowered and supported in position to engage a peripheral surface portion of the conical members o and 107 of relatively large diameter corresponding to the diameter of relatively large bottles, and when in lowered position said members 156 and 161 will engage peripheral surface portions of the members o and 107 of relatively small diameter corresponding to the diameter of bottles to be operated upon when the parts 156 and 161 are in such position. It will thus be readily seen that when the members 156 and 161 are in position shown in Fig. 2, the shaft 115 with the body label receptacles thereon will be held yieldingly at the required distance from the axial center of the standard or shaft e or axis of rotation of the main rotative bottle-supporting frame or drum g to enable the device to operate in an efficient manner and to secure the labels to bottles of a diameter corresponding with the diameter of the conical members o and 107 engaged by the segmental members 156 and 161, respectively. The raising of the members 156 and 161 to a position above that shown in said figure will cause the shaft 115 and body label receptacles supported thereby to be maintained at a greater distance from the axis of the drum g, thereby enabling bottles of greater diameter to be operated upon. It follows, as a matter of course, that the lowering of the members 156 and 161 to a position below that shown in Fig. 2 will permit the shaft 115 with the body label receptacles supported thereby to be moved inward by the action of the springs 118 to a position nearer to the axis of the standard e or drum g than that shown in Fig. 2, so that bottles of smaller diameter than that shown in said figure may be operated upon in an efficient manner. The radial movement of the individual label receptacles 139 with respect to the axis of the shaft 115, which movement is permitted and yieldingly resisted by the springs 146, is sufficient to provide for the comparatively slight difference in the diameters of bottles of a given size—for instance, pint bottles—when the members 156 and 161 have been adjusted for bottles of such given size. The slight movement of the label receptacles 139 upon the axes formed by the vertical pivots 141, which movement is permitted and yieldingly resisted by the compressible springs 153, enables each receptacle 139 to yield sufficiently to automatically adjust itself circumferentially when an oversized or relatively large bottle of a given capacity comes into position to engage a label contained in such label receptacle. Each peripheral segmental portion 159 of the bottle-rotating member or wheel 156 is located directly beneath a label receptacle 139, and each projecting peripheral portion 162 of the positioning member 161 is beneath the space between a plurality of the label receptacles 139, so that the projecting portions 159 are in engagement with a conical friction member or gear $o$ when the corresponding bottle is in contact with a label.

In Fig. 25 the bottle $j$ at the left of the figure is shown in the position which it would occupy when the corresponding member $o$ first comes in contact with a segmental peripheral portion 159 of the bottle-rotating member 156 and when the bottle is in position to first come in contact with the body label to be attached thereto. The bottle $j$ farther to the right in said figure is shown with the label attached thereto and with the bottle in the position which it would occupy upon the completion of the operation of securing the label thereto. In Fig. 26 the bottle is shown in the position which it would occupy while in engagement with a label during the operation of securing the label to the bottle and with a portion of the label secured to the bottle, and a portion still to be secured thereto, the parts being in the position shown in Figs. 1 and 2. Another bottle is shown in the position which it would occupy before coming in contact with the label, and still another is shown in the position which it would occupy with the label secured in position thereon and while the next adjacent bottle is in engagement with a label in the process of being applied.

The body label having been applied to a bottle and the adhesive for securing the neck label thereto having been applied previous to the securing of the body label to the bottle, as already described, the movement of the bottles is continued until they have each successively reached a position to enable the neck labels to be applied to the necks of the bottles. After moving out of engagement with the bottle-rotating segmental wheel or member 156 and before reaching the corresponding bottle-rotating member 206 of the neck labeling device E hereinafter described, each conical friction member or wheel $o$ is brought into contact with a segmental shoe or bottle-rotating member 240 which has an inner curved surface portion held yieldingly in position to engage and cause the rotation of each conical friction member $o$ as it comes in contact with said surface, thereby turning each bottle-supporting spindle $k$ and the bottle supported thereby on their axes from the last position in which they left the body labeling device to the desired position to be engaged or operated upon by the neck-labeling device E. This member 240 (see Fig. 1) is provided with a stem 241 which is slidably mounted in a stationary support or bracket comprising parts 242 and 243 connected by bolts 244 and forming a socket into which said stem extends. In this socket is a compressible spring 245 for holding the member 240 yieldingly in engagement with the members $o$. The member 240, in other words, is mounted and yieldingly supported in the same manner as the member 103 already described, and serves to rotate the bottles in a similar manner. A lower laterally movable cross-head or sliding supporting frame 224 comprising in its construction a sliding bearing member 224' (see Figs. 10 and 11), is mounted upon and in sliding engagement with stationary parallel guide rods 225 which are supported by depending portions 226 of a cross frame member 227 which forms a part of the upright frame 174 of the neck-labeling device E. This bottom cross-head 224 and the means for supporting it are of the same construction as the corresponding parts 111, 119 and 124 of the body-labeling device, already described.

An upper laterally movable cross-head or sliding frame and upper yielding bearing 228 is slidably mounted upon parallel guiding and supporting rods 229 which are mounted in the upper part of the frame 174, and a laterally slidable yielding upper bearing is thus formed for the spindle or shaft 188, the lower end of which is thus supported in the bearing member 224' or head 224 and the upper portion of which extends through the head or upper bearing 228 and in supporting engagement with the head or support 188' which forms a support for the receptacles 189 for containing the neck labels. An annular collar or filler 230 and a cam-supporting member 231 are secured in fixed relation to the head 228 and form a support for a cam 215 hereinafter more particularly described. The filler 230 corresponds with the filler member 165 already described. The head 228 corresponds with the head 116 already described and is yieldingly engaged and held in position laterally by springs 418 which correspond with springs 118 already described, but the head 188' is supported by the cam 215 in the manner hereinafter more particularly described, and the cam may be raised or lowered with respect to the shaft 188 and may be secured in any desired adjusted position by means of a set screw 232 and sleeve 233 engaged by the set screw. The filler 230 may be removed and replaced by another of any desired thickness.

Before describing the parts which are supported upon the spindle or shaft 188 in detail, the driving mechanism or means for operatively connecting the spindle or shaft with the other parts of the machine and with the main driving shaft will be described.

A worm wheel 234 is mounted on and in fixed relation to the lower portion of the shaft or spindle 188 to which it is secured by a key 235 (see Figs. 10 and 15) and is in toothed engagement with a worm 236 on a worm shaft 181 journaled in bearings 237 and 238 in the bottom radially movable head or bearing member 224, and which worm and shaft and the means for operating the same are hereinafter more particularly described.

A shaft 175 (see Figs. 10 and 15) is operatively connected with the shaft 40 which is connected with the main drive shaft 43 and with a source of power as already described. This shaft 175 is journaled in suitable bearings 176 and 177 and is provided with a spiral gear wheel 178 fixed to one end of said shaft and in toothed engagement with the spiral gear wheel 132 already described, and which last-mentioned gear meshes with spiral gear wheel 131 on the shaft 40. The opposite end of the shaft 175 is provided with a spiral gear wheel 179 fixed thereto and in toothed engagement with a spiral gear wheel 180 mounted on and adapted to rotate with and permit the longitudinal movement of a worm shaft 181 in the same manner in which the gear 132 is connected with the worm shaft 127 as already described (see Figs. 10 and 15). The gear wheel 180 is operatively connected with the shaft 181 by means of a movable clutch member 183 which is slidably mounted upon the shaft 181 and connected with said shaft by means of a key or spline 184 which is adapted to engage a slot in the movable clutch member 183. Said clutch member is thus adapted to rotate with and to be moved longitudinally of the shaft 181 to the position shown in Figs. 10 and 15, in which position the jaws of the movable clutch member are held in clutching engagement with the jaws of a clutch member 185 which is in fixed relation to the gear wheel 180 and is identical with clutch member 135 already described (see Fig. 10). The gear wheel 180 is thus connected with the shaft 181 so as to rotate therewith. The movement of the clutch member 183 longitudinally of the shaft 181 in a direction away from the gear 180 and clutch member 185 will of course release the clutch members 183 and 185 from clutching engagement with each other, and permit the free rotation of the gear wheel 180 with respect to the shaft 181. The gear wheel 180 has a sleeve or elongated hub 182' rotatable in a bearing 187' and encircling the shaft 181, and on the end portion of this sleeve is a collar 183' for preventing the movement of the gear 180 longitudinally of its axis (see Figs. 10 and 15). One end of the shaft 175 is, as already suggested, journaled in the bearing 177 in a frame member 186, and the gear 179 is fixed to said shaft. The worm shaft 181 has its inner end portion encircled by the sleeve 182' and the bearing 187' formed by a stationary bracket arm 187, said arm 187 being supported by or forming an integral part of the upright frame portion 174, as shown in Fig. 15. It will thus be seen that by merely operating the movable clutch member 183 manually or by mechanical means which may be of any ordinary or well known form, the rotative shaft 181 of the neck-labeling device E may be operatively connected with the source of power or driving mechanism or disconnected therefrom, as desired.

Mounted upon and in fixed relation to the upper portion or end of an upright spindle or shaft 188 is a head or supporting frame 188' (see Figs. 1, 10 and 11) which forms a rotative support for a series of laterally movable pivoted label receptacles or boxes 189 adapted to rotate with said shaft. Each box or label receptacle 189 is pivotally secured to and supported by a transversely movable box-supporting member 190, by means of a slightly inclined pivot 191 which projects upward from and is supported by the inner end of the sliding box-supporting member 190 (see Figs. 10 and 11). Each box-supporting member 190 has a depending arm portion or boss 192 which may form an integral part of the member 190, and a radial guiding rod 193, having its inner end secured to and supported by the hub portion 194 of the head 188' and its outer end supported by the outer peripheral portion of the head 188', extends beneath each slidable label box-supporting member 190 and through a bearing member 192 having a horizontal aperture therethrough, for receiving such guiding rod. Each of the depending arms or guiding members 192 is provided with a radial boss or stud 195 which is integral therewith and through which a corresponding guide rod 193 extends. A compressible spring 196 encircles each guide rod 193. The inner end of each spring 196 is in engagement with the hub 194, the outer end of each spring being in engagement with the depending portion or guiding member 192 of the transversely slidable label box-supporting member 190. Each spring 196 is thus adapted to press the corresponding transversely movable box-supporting member 190 outward radially with respect to the axis of the shaft, and with it the corresponding label receptacle 189 and the pivot pin 191 which pivotally connects the label receptacle 189 with its transversely slidable support 190 (see Figs. 10 and 11). Each label box or receptacle 189 is provided with a label-feeding member or plate 197 (see Fig. 10). Each label-feeding member 197 is provided with an inclined radial guiding shank or stem 198 in fixed relation thereto or integral therewith and extending into an inclined radial aperture in the radially projecting inclined boss or guiding stud 199 which is in rigid relation to or may form an integral part of the hub 200 of the corresponding label receptacle or box 189 and through which hub extends the nearly vertical pivot 191 which pivotally connects the label receptacle with its slidable supporting member 190. A compressible spring 190' for each label receptacle 189 is mounted in position to encircle the shank 198 of the corresponding label-feeding plate 197 and also in position to encircle the corresponding inclined radial boss 199 so as to yieldingly press the label-feeding plate 197 laterally or in the direction of the discharge opening of the corresponding label receptacle 189, thus feeding the labels contained in the receptacle into position to be successively attached to the bottle necks as they are presented in position to receive the labels. The label receptacles or boxes 189 are adapted to be readily removed and recharged and replaced independently of one another. Each supporting member 190 is provided with an upwardly projecting lug or finger 201 (see Fig. 1) located on one side of the corresponding label receptacle or box 189 and with a similar upwardly projecting lug 202 in fixed relation to or integral with the member 190 and located on the opposite side of the label receptacle 189, and a compressible spring 203 is mounted between the lug 202 and the adjacent side of the label receptacle 189 and is adapted to yieldingly hold the latter normally in engagement with the lug 201, and to permit the movement of the receptacle 189 upon its pivot 191 and against the tension of the spring 203 when a bottle of comparatively large diameter is presented in position to engage the outermost label contained in the label receptacle or box. Each receptacle or box 189 is provided with lugs 204 (see Fig. 11) extending inward from the opposite margins or side walls of the box at the opposite marginal edges of the open end or label-discharging mouth of the latter and in position to engage the marginal edges of the labels 205 in such a manner as to permit the neck labels to be successively attached to the necks of the bottles as the latter pass into position to receive the same from the label receptacles or boxes 189 (see Fig. 11). The shaft 188 upon which the neck label receptacles 189 are supported, is provided with a bottle-rotating member or friction wheel 206 which is connected with the shaft by means of a key or spline 207 and a hub 208 in such a manner as to rotate with the shaft but permit the member 206 to be adjusted upwardly or downwardly longitudinally of the shaft. This bottle-rotating member or wheel 206 is provided with a multiplicity of segmental peripheral portions 209 which project outward beyond the intermediate peripheral portions 210, as indicated in Figs. 10 and 11, into position to engage the peripheries of the conical friction members or bottle-rotating members $r$ which are keyed to the vertical spindles $k$ upon which the bottles to be operated upon are supported. A similar positioning member 211 which may be mounted upon or may be integral with the member 206, with which it is connected by means of the hub 208, as shown in Figs. 10 and 11, is mounted, by preference, directly below the bottle-rotating wheel or member 206 and in fixed relation to the latter. This positioning member is provided with a series of projecting peripheral portions 212 which project laterally beyond the intermediate peripheral portions 213 and into position to engage the peripheries of the conical idler members 100 which are mounted upon and rotate with respect to the shafts $k$, as already described (see Figs. 10 and 11).

The bottle-rotating member 206 and positioning member 211 correspond with and are constructed and operate in substantially identically the same manner as the members 156 and 161, respectively, of the body-labeling device D already described, and the device E for attaching the neck labels is constructed and operates the same as the device D or body-labeling device, except in those features of construction and operation in which the differences are pointed out.

The laterally projecting peripheral portions 212 of the positioning member 211 are in staggered relation to the similar projecting peripheral portions 209 of the bottle-rotating wheel 206, or directly beneath the spaces between said segmental portions 212. They thus engage the peripheral surfaces of the members 100 so as to hold the shaft 188 and the labeling mechanism supported by said shaft in proper position with respect to the bottles $j$, or, in other words, in proper position with respect to the axis of the main bottle-supporting frame or drum $g$ when the bottle-rotating wheel 206 is not in engagement with any conical bottle-rotating member or conical friction wheel $r$. The recesses between the outwardly projecting peripheral portions 212 of the positioning member 211 permit the idler members 100 to move freely along without engaging the member 211 when the conical members $r$ are in engagement with the bottle-rotating member 206. By the above arrangement it will be seen that the segmental peripheral portions of the bottle-rotating member 206 are adapted to engage the conical bottle-rotating members $r$ successively and thereby cause the bottles supported upon the corresponding shafts or vertical spindles $k$ to be rotated in the required direction while in engagement with the neck labels during the operation of attaching the latter to the bottle necks. The shaft 188 is held against the tension of the spring 418 or outward in proper position during the intervals of time in which the bottles upon the corresponding shafts $k$ are not being rotated by the bottle-rotating members 206 and $r$.

It is of course desirable to provide means whereby the neck label receptacles may be raised or lowered as required by reason of the varying sizes of the bottles and the shapes of the bottle necks to which the neck labels are to be attached. An annular cam 215 is therefore provided and mounted in position to encircle the angular portion 216 of the shaft 188, and idlers or anti-friction rollers 217 are rotatively mounted between depending supporting arms 217' of the head or frame 188' which supports the label receptacles 189. These rollers 217 rest upon the irregular upper cam surface of the annular cam 215 and form supports for the head 188 and neck label receptacles 189. The cam being stationary, it will be readily seen that as the shaft 188 and head 188' are rotated the head and with it the neck label receptacles 189 will be alternately raised and lowered while rotating, thus causing the labels to be secured or wrapped in spiral position or with one end higher than the other on the necks of the bottles, as desired. The label receptacles are thus enabled to be moved upwardly to the position indicated in Fig. 11 or downwardly to lowered position with their rollers 217 in engagement with the lower cam portions 215' intermediate the higher cam portions on which the rollers are supported when in the position shown in Fig. 11.

In order to enable the bottle-rotating member or wheel 206 and the positioning member 211 to operatively engage the conical members $r$ and 100, respectively, at points upon the peripheries of said conical members where the diameter of the part of the conical member engaged will correspond with the diameter of the portion of the bottle neck upon which the label is to be placed, it is desirable to provide means whereby the bottle-rotating member 206 and positioning member 211 may be adjusted upwardly or downwardly with respect to the members $r$ and 100. The shaft 188 is, therefore, provided with a screw 218, and a sleeve or nut 219 having an inner screw thread in threaded engagement with the screw 218 encircles the screw and is provided with an operating hand wheel 220 for rotating the nut or sleeve. The nut or sleeve is provided with an annular flange 221 at its lower end (see Fig. 10), and an annular plate or washer 222 is secured by means of bolts 223 in position to engage the inner side of the flange 221 and support the hub 208 and members 206 and 211 so that the rotation of the nut or threaded sleeve 219 in one direction will raise the segmental bottle-rotating member or wheel 206 and the segmental positioning member 211, and the rotation of the nut in the opposite direction will lower said members. The members 206 and 211 will thus be supported in position to engage a peripheral surface portion of the conical members $r$ and 100 of relatively large diameter corresponding to the diameter of the necks of relatively large bottles, and when in lowered position said members 206 and 211 will engage peripheral surface portions of the members $r$ and 100 of relatively small diameter corresponding to the diameter of bottle necks to be operated upon when the parts 206 and 211 are in such position. It will thus be readily seen that when the members 206 and 211 are in the position shown in Fig. 10 the shaft 188 with the neck label receptacles thereon will be held yieldingly at the required distance from the axial center of the standard or shaft $e$ or axis of rotation of the main rotative body bottle-supporting frame or drum $g$ to enable the device to operate in an efficient manner and to secure the labels to bottles of a diameter corresponding with the diameter of the conical members $r$ and 100 engaged by the segmental members 206 and 211, respectively. The lowering of the members 206 and 211 to a position below that shown in said figure will cause the shaft 188 and the neck label receptacles supported thereby to be maintained at a less distance from the axis of the drum $g$, thereby enabling bottle necks of less diameter to be operated upon. It follows, as a matter of course, that the raising of the members 206 and 211 to a position above that shown in Fig 10 will permit the shaft 188 with the neck label receptacles supported thereby to be moved outward against the tension of the springs 418 to a position farther from the axis of the standard $e$ or drum $g$ than that shown in Fig. 10, so that bottle necks of larger diameter than that shown in said figure may be operated upon in an efficient manner. The radial movement of the individual label receptacles 189 with respect to the axis of the shaft 188, which movement is permitted and yieldingly resisted by the springs 196, is sufficient to provide for the comparatively slight difference in the diameters of bottles of a given size—for instance, pint bottles—when the members 206 and 211 have been adjusted for bottles of such given size. The slight movement of the label receptacles 189 upon the axes formed by the pivots 191, which movement is permitted and yieldingly resisted by the compressible springs 203, enables each receptacle 189 to yield sufficiently or automatically adjust itself circumferentially when an oversized or relatively large bottle neck of a given capacity comes into position to engage a label contained in such label receptacle. Each outer projecting peripheral segmental portion 209 of the bottle-rotating member or wheel 206 is located directly beneath a label receptacle 189 (see Figs. 10 and 12), and each projecting peripheral portion 212 of the positioning member 211 is beneath the space between a plurality of the label receptacles 189, so that the projecting portions 209 are in engagement with a conical friction member or gear $r$ when the corresponding bottle is in contact with a label.

After leaving the neck-labeling device E, the movement of the bottles is continued until they reach the discharging device F by means of which they are removed from the machine or from the rotary bottle-supporting drum or body $g$. This discharging device (see Figs. 1 and 19) comprises a rotary discharging member 246 mounted upon a vertical rotary shaft or spindle 247, and having upper radial arms 248 and lower radial arms 249 connected by a hub 250 adapted to receive bottles therebetween as the bottles are released by the cam 2 raising the bracket arms $s$ out of engagement with the bottles. The shaft 247 is rotatively mounted in a stationary support or bracket 251 (see Fig. 19) and the discharging member 246 with its radial arms rotates within an annular casing 252 which partially encircles the member 246 and has a bottle-receiving opening 253 and discharge opening 254 adapted to discharge the bottles into a chute or receptacle 255 (see Figs. 1 and 19). A lower sprocket 256 having radial arms 257 directly beneath the arms 248 and 249 is fixed to the shaft 247 below the casing 252, and these radial arms 257 are adapted to engage and admit therebetween the peripheral radially projecting bosses or fingers 33 on the periphery of the rotary bottle-supporting member $g$, so that the sprocket 256 and shaft 247 and bottle-discharging member 246 are rotated thereby, thus discharging the bottles into the chute or receptacle 255, shown in Fig. 1.

In operation, the main drive shaft 43 (see Fig. 15) rotates the auxiliary or worm shaft 40, thereby causing the worm 39 on the shaft 40 to rotate the worm wheel 37 on the tubular shaft or sleeve $i$, and the main rotary body or drum $g$, causing the latter to carry the bottles, cans or other articles to be labeled and which are supported upon the auxiliary peripheral rotatable supporting spindles or shafts $k$ in a circular path and successively and, by preference, in a continuous, uninterrupted movement from the initial feeding device A to position to be operated upon by the rotary brush and buffer mechanism B, then to position to receive adhesive material applied to the body of the bottle, can or receptacle by the adhesive-applying device C, then to position to receive a body label from the body label receptacles of the body labeling device D, then into position to be rotated by the friction member 240 into position to present the desired portion of the neck of the bottle to which adhesive has been applied in position to receive a neck label from the neck-labeling device E, then into position to be discharged from the machine or main rotary body $g$ by the rotary discharging device F.

The rotation of the shaft 40 causes the worm shaft 127 of the body labeling device to rotate the spindle 115 and thereby the body label supporting receptacles upon said spindle, thus bringing each of the body label receptacles successively into position to support the outermost label contained in such receptacle in position to engage the body of the bottle, can or other article to be labeled, the required quantity of adhesive material having been applied to the body and neck portions of the bottle or the required portions of the articles to be labeled by forcing the adhesive material through nozzles 66 and 71 onto the surfaces of the articles to be labeled, the adhesive material being forced out of the receptacle 63 of the adhesive-applying device C by the rotation of the sprocket or star-shaped wheel 97 and the gearing and pawl and ratchet mechanism, by means of which said wheel 97 is operatively connected with the adhesive-feeding piston 64, as shown in Fig. 13, the wheel 97 being rotated by means of the anti-friction rollers 100 on the lower ends of the shafts $k$ as the said anti-friction rollers are successively brought into position to engage the radial arms or teeth of the rotary sprocket 97, shown in Figs. 13 and 14. The rotation of the shaft 40 also causes the shaft 175 to rotate, the latter shaft being operatively connected with the shaft 40 by the gears 131, 132 and 133, shown in Fig. 15, as already described, and the shaft 175 being connected with the worm shaft 181 causes the latter to rotate and thereby rotates the worm 236 which meshes with the worm wheel 234 on the bottom of the spindle or shaft 188 of the neck-labeling device, thus causing the neck label receptacles to be rotated and successively brought into position to present labels in position to engage the necks of the bottles to be labeled (see Figs. 10 and 15). The continued rotation of the main rotary body or drum $g$ brings the bottles or articles upon which the labels have been applied into position to extend between the arms 248 of the discharging reel or wheel 246, and the labeled articles or bottles are fed by the rotation of said reel into the discharge chute 255, the bottles or articles being released by the raising of the clamping brackets $s$ which is effected by the anti-friction rollers 3 coming in contact with the segmental cam 2 which holds the clamping or securing brackets $s$ in raised or releasing position until the bottles are fed into position between the bracket arms $s$ and the auxiliary supporting spindles $k$ by the initial feeding reel or sprocket 25. This initial feeding reel or sprocket 25 is rotated by means of the peripheral sprocket teeth or projections 33 of the drum coming in contact with the sprocket teeth 31 of the sprocket 30 mounted on the shaft 19 on which the reel or initial feeding wheel 25 is mounted, as best shown in Fig. 16. The cam 2 permits the bracket arms $s$ to engage the bottle or other article to be operated upon while the latter is between the radial arms of the reel or feeding wheel 25 (see Figs. 1 and 16). The rotary brush 50 and the buffer wheel 58, shown in Fig. 1, are rotated by means of the gears 57 and 61 on the main drive shaft 43, which gears mesh with gears or pinions 56 and 60 on the shafts 51 and 59, respectively (see Fig. 15).

The bottles or receptacles to be labeled are rotated intermittently while passing the adhesive-applying device C by means of the segmental bottle-rotating friction member 103 which engages the conical, beveled or tapered friction wheels $o$, as indicated in Fig. 13, and the bottles are permitted to pass the nozzles 66 and 71 while not rotating upon their axes, by the action of the positioning segments 104 which engage the idler conical wheels 107 upon the shafts $k$ while the friction members $o$ are passing the recesses 106, shown in Figs. 20 to 23 inclusive, and are out of engagement with the segmental portions 105 of the friction member 103. The adhesive material is applied to the bottle or article to be labeled while the latter is not in rotation upon its axis and while the friction member $o$ is passing the recesses 106 in the friction member 103. The bottles or articles to be labeled are caused to rotate properly upon their axes while in engagement with the labels to be applied thereto by the body-labeling device D. This is accomplished by the peripheral segmental portions 159 of the segmental bottle-rotating wheel 156 coming in contact with the conical friction wheels $o$ and thereby rotating the corresponding supporting spindle $k$ upon which the bottles or articles to be labeled are mounted. The bottles or articles to be labeled are rotated upon their axes in a similar manner intermittently as they pass the neck-labeling device E by means of the laterally projecting segmental portions 209 of the bottle-rotating member or wheel 206, which corresponds with the member 156 of the body-labeling device. The vertical shaft or spindle 115 of the body-labeling device and the corresponding vertical shaft or spindle 188 of the neck-labeling device, and with them the label receptacles supported by said spindles, are held in proper position against the tension of the springs 118 and 418, respectively, by the segmental peripheral portions of the positioning members 161 and 211, respectively, which are adapted to engage the idlers 107 on the shafts or spindles $k$ when the conical friction wheels $o$ are not engaged by the devices for rotating the same.

It will thus be seen that the adhesive material is applied to the surfaces of the bottles or articles to be labeled while the bottle or article is not rotating upon its axis but while the main rotary body or drum $g$ is in motion, and that the body and neck labels are applied while the main rotary body or drum $g$ is in rotation and while the bottles or articles to be labeled are rotating upon their axes and while the label receptacles are in motion or rotating with the spindles 115 and 188, respectively, and that during the operation the main rotary body or drum $g$ is adapted to be kept in motion continuously and without interruption, and that the body label and neck label receptacles are also adapted to be kept constantly in motion or constantly rotating during the entire operation, and that means is provided whereby the bottles or articles to be labeled are adapted to be rotated upon their axes intermittently, as required, and without interrupting the constant or continuous operation of the main rotary body and the label receptacles.

I have shown and described one particular form of a labeling machine embodying the features of my invention, but it is of course to be understood that the details of construction and arrangement of parts may be variously modified in practice without departing from the spirit and scope of my invention, and I do not wish to be limited to the exact features of construction and arrangement of parts shown, except so far as the same may be defined in the appended claims.

I claim:

1. In a labeling machine, the combination of a main rotary supporting member, an auxiliary member rotatably mounted on the same and adapted to form a rotative support for an article to be labeled, a supporting frame rotatably mounted adjacent to said main rotary supporting member, a label-containing receptacle pivotally mounted on said frame and adapted to support a label in position to engage the surface of said article, means for rotating the main rotary supporting member, means for rotating the auxiliary supporting member simultaneously with the main rotary supporting member, and means for rotating said frame.

2. In a labeling machine, the combination of a main rotary supporting member, a spindle rotatably mounted on the same and adapted to support the article to be labeled, a supporting frame rotatably mounted adjacent to the main rotary supporting member, a plurality of label-containing receptacles yieldably mounted on said supporting frame, means for rotating the main rotary supporting member, means for rotating the supporting frame, and means for rotating the spindle.

3. In a labeling machine, the combination of a main rotary supporting member, a series of auxiliary supporting members rotatably mounted on the same and adapted to form supports for articles to be labeled, means for applying adhesive material to the surface of the articles, a supporting frame rotatably mounted adjacent to the main rotary supporting member, a plurality of label-containing boxes pivotally and yieldably mounted on said frame, means for rotating the main rotary supporting member, means for rotating the auxiliary supporting members, and means for rotating said supporting frame.

4. In a labeling machine, the combination of a main rotary supporting member, a series of spindles rotatably mounted on the same and adapted to support articles to be labeled, a supporting frame rotatably mounted adjacent to the main rotary supporting member, a plurality of label-containing boxes yieldably mounted on said supporting frame, means for rotating the main rotary supporting member, means for rotating said spindles, and means for rotating said supporting frame simultaneously with the main supporting member.

5. In a labeling machine, the combination of a main rotary supporting member, a vertical spindle rotatively mounted on the same and adapted to support an article to be labeled, means for applying adhesive material to the surface of the article, embracing a nozzle adapted to yieldingly engage said article, a label receptacle mounted adjacent to the main rotary supporting member and adapted to support a label in position to engage the surface of the article, means for rotating the main rotary supporting member, and means for rotating the spindle.

6. In a labeling machine, the combination of a main rotary supporting member, an auxiliary supporting member rotatably mounted on the same and adapted to form a support for an article to be labeled, a supporting frame rotatably mounted adjacent to said main supporting member, a label receptacle pivotally mounted on said frame and adapted to support a label in position to engage the surface of the article to be labeled, means for rotating the main rotary supporting member, means for rotating the auxiliary rotary supporting member, means for rotating said frame, and means for adjusting the label receptacle in the direction of the axis of rotation of said main rotary member.

7. In a labeling machine, the combination of a main rotary supporting member, a series of auxiliary supporting members rotatably mounted on the same and adapted to support the articles to be labeled, a supporting frame rotatably mounted adjacent to said main supporting member, a plurality of label-containing receptacles mounted on said frame and adapted to support labels in position to engage said articles, means for rotating the main supporting member, means for rotating said supporting frame, and speed-varying means rotatably connecting said auxiliary rotary supporting members with said supporting frame.

8. In a labeling machine, the combination of a main rotary supporting member, an auxiliary supporting member rotatably mounted on the same and adapted to form a support for an article to be labeled, a supporting frame rotatably and yieldably mounted adjacent to said main rotary supporting member, a label receptacle mounted on said frame and adapted to support a label in position to engage the surface of said article, means for rotating the main rotary supporting member, means for rotating the auxiliary supporting member, and means for rotating said frame.

9. In a labeling machine, the combination of a main rotary supporting member, an auxiliary supporting member rotatably mounted on the same and adapted to form a support for an article to be operated upon, means for applying a coating of adhesive material to the surface of the article to be operated upon, a label receptacle located adjacent to the main rotary supporting member and adapted to support a label in position to engage the surface of the article to be operated upon, means for rotating the main rotary supporting member, means for intermittently rotating the auxiliary supporting member upon its axis during the rotation of the main rotary supporting member, a yielding rotative supporting member upon which the label receptacle is supported, and means for rotating the label receptacle.

10. In a labeling machine, the combination of a main rotary supporting member, an auxiliary supporting member rotatably mounted on the same and adapted to form a support for an article to be labeled, means for applying a coating of adhesive material to the surfaces of the article to be labeled, a label receptacle mounted adjacent to the main rotary supporting member and adapted to support a label in position to engage the surface of the article to be labeled, means for rotating the main rotary supporting member, a vertical spindle upon which the label receptacle is supported, a laterally movable bearing in which the vertical spindle is rotatively mounted, and means for permitting and yieldingly resisting lateral movement of the spindle.

11. In a labeling machine, the combination of a main rotary supporting member, an auxiliary supporting member rotatably mounted on the same and adapted to form a support for an article to be labeled, means for applying a coating of adhesive material to the surfaces of the article to be labeled, a label receptacle mounted adjacent to the main rotary supporting member and adapted to support a label in position to engage the surface of the article to be labeled, means for rotating the main rotary supporting member, a vertical spindle upon which the label receptacle is supported, a laterally movable bearing in which the vertical spindle is rotatively mounted, means for permitting and yieldingly resisting lateral movement of the spindle, and means for rotating the vertical spindle.

12. In a labeling machine, the combination of a main rotary supporting member, an auxiliary supporting member rotatably mounted on the same and adapted to form a support for an article to be labeled, means for applying a coating of adhesive material to the surfaces of the article to be labeled, a label receptacle mounted adjacent to the main rotary supporting member and adapted to support a label in position to engage the surface of the article to be labeled, means for rotating the main rotary supporting member, a vertical shaft forming a rotative support for the label receptacle, a spring pressed yielding bearing for said shaft, and means for rotating the shaft during the rotation of the main rotary supporting member.

13. In a labeling machine, the combination of a main rotary supporting member, a series of vertical spindles rotatably mounted on the peripheral portion of the same and adapted to form rotative supports for articles to be labeled, means for removably securing an article to be labeled upon each vertical spindle, means for applying a coating of adhesive material to the surfaces of the articles to be operated upon, a label receptacle located adjacent to the main rotary supporting member and adapted to support a label in position to engage the surface of an article to be operated upon, a vertical shaft rotatively mounted and forming a support for the label receptacle, means for rotating the main rotary supporting member, means for rotating each vertical supporting spindle upon its axis and means for rotating the label receptacle.

14. In a labeling machine, the combination of a main rotary supporting member, a series of upright spindles rotatably mounted on the peripheral portion of the main rotary supporting member and adapted to form supports for articles to be labeled, means for removably securing an article to be labeled in position upon each of such rotary spindles, means for applying a coating of adhesive material to the surfaces of the articles to be operated upon, a series of label receptacles located adjacent to the main rotary supporting member and each adapted to be moved into position to support a label in engagement with the surface of an article to be labeled, a vertical shaft rotatively mounted and forming a support for the series of label receptacles, means for rotating the main rotary supporting member, means for rotating the upright spindles upon their axes during the rotation of the main rotary supporting member, and means for rotating the vertical shaft upon which the label receptacles are mounted.

15. In a labeling machine, the combination of a main rotary supporting member, a series of vertical bottle-supporting spindles mounted on the same, means for applying a coating of adhesive material to the surfaces of the bottles, a series of label receptacles located adjacent to the main rotary supporting member and each adapted to be moved into position to support a label in engagement with the surface of an article to be labeled, means for rotating the main rotary supporting member, a vertical spindle upon which the label receptacles are supported, a friction wheel fixed to each bottle-supporting spindle, and a rotary friction member fixed to the label receptacle supporting spindle and adapted to frictionally engage the friction wheels on the bottle-supporting spindles successively, for rotating the latter and thereby the bottles to be labeled.

16. In a labeling machine, the combination of a main rotary supporting member, a series of vertical bottle-supporting spindles mounted on the same, means for applying a coating of adhesive material to the surfaces of the bottles, a series of label receptacles located adjacent to the main rotary supporting member and each adapted to be moved into position to support a label in engagement with the surface of an article to be labeled, means for rotating the main rotary supporting member, a vertical spindle upon which the label receptacles are supported, a tapered friction wheel fixed to each bottle-supporting spindle, a segmental rotary friction member fixed to the label receptacle supporting spindle and having segmental peripheral portions adapted to frictionally engage the friction wheels on the bottle-supporting spindles successively, for rotating the latter, and means for rotating the label receptacle supporting spindle.

17. In a labeling machine, the combination of a main rotary supporting member, a series of vertical bottle-supporting spindles mounted on the same, means for applying a coating of adhesive material to the surfaces of the bottles, a series of label receptacles located adjacent to the main rotary supporting member and each adapted to be moved into position to support a label in engagement with the surface of an article to be labeled, means for rotating the main rotary supporting member, a vertical spindle upon which the label receptacles are supported, a friction wheel fixed to each bottle-supporting spindle, an idler roller rotatively mounted upon each bottle-supporting spindle, a rotary segmental friction member fixed to the label receptacle supporting spindle and adapted to frictionally engage the friction wheels which are fixed to the bottle-supporting spindles, a segmental positioning member fixed to the label receptacle supporting spindle and having peripheral segmental portions adapted to engage the idler rollers upon the bottle-supporting spindles, and means for rotating the label receptacle supporting spindle.

18. In a labeling machine, the combination of a main rotary supporting member, a series of vertical bottle-supporting spindles mounted on the same, means for applying a coating of adhesive material to the surfaces of the bottles, a series of label receptacles located adjacent to the main rotary supporting member and each adapted to be moved into position to support a label in engagement with the surface of an article to be labeled, means for rotating the main rotary supporting member, a vertical spindle upon which the label receptacles are supported, a friction wheel fixed to each bottle-supporting spindle, an idler roller rotatively mounted upon each bottle-supporting spindle, a rotary segmental friction member fixed to the label receptacle supporting spindle and adapted to frictionally engage the friction wheels which are fixed to the bottle-supporting spindles, a segmental positioning member fixed to the label receptacle-supporting spindle and having peripheral segmental portions adapted to engage the idler rollers upon the bottle-supporting spindles, a laterally movable bearing in which the label receptacle supporting spindle is rotatively mounted, spring mechanism in engagement with the laterally movable spindle bearing for permitting and yieldingly resisting lateral movement of the spindle and label receptacle, and means for rotating the receptacle supporting spindle.

19. In a labeling machine, the combination of a main rotary supporting member, an auxiliary supporting member rotatably mounted on the same and adapted to form a support for an article to be labeled, a nozzle adapted to yieldingly engage the article, means for rotating the main supporting member and the auxiliary supporting member simultaneously when the article is in engagement with the nozzle, means for automatically positively forcing adhesive to said nozzle, and a label-containing receptacle supported adjacent to said main supporting member and adapted to apply a label to the article after adhesive has been applied thereto by said nozzle.

20. In a labeling machine, the combination of a main rotary supporting member, a series of bottle-supporting spindles mounted on the same, means for applying a coating of adhesive material in position to adhesively engage the surfaces of the bottles and the labels to be attached to the bottles, a series of label receptacles rotatively mounted adjacent to the main rotary supporting member and each forming a separate compartment adapted to contain a multiplicity of labels, means for automatically feeding the labels successively into position to engage the surface of the article to be labeled, a rotative vertical spindle upon which the label receptacles are supported, a laterally movable bearing in which the vertical spindle is rotatively mounted, spring mechanism in engagement with the laterally movable spindle bearing for permitting and yieldingly resisting lateral movement of the spindle and label receptacles, and driving mechanism operatively connected with the label receptacle supporting spindle and with the main rotary supporting member and adapted to rotate the same simultaneously and continuously.

21. In a labeling machine, the combination of a main rotary supporting member, a series of bottle-supporting spindles each rotatably mounted on a peripheral portion of the main rotary supporting member, means for applying adhesive material to the surfaces of the bottles to be labeled, a series of label receptacles mounted adjacent to the main rotary supporting member and each forming a label-containing compartment, means for feeding labels contained in said compartments into position to engage the surface of an article to be labeled, a rotary vertical shaft forming a support for the label receptacles, a segmental friction member adjustably mounted on said vertical shaft, a friction member fixed to each bottle-supporting spindle and having peripheral surface portions of different diameters corresponding with the diameters of bottles to be labeled, and adapted to be engaged by the adjustable friction member, for enabling bottles to be rotated at a peripheral speed equivalent to the speed of movement of the bottle-engaging labels, and means for rotating the main rotary supporting member and the label receptacle supporting shaft simultaneously.

22. In a labeling machine, the combination of a main rotary supporting member, a bottle-supporting spindle rotatably mounted on the same, spring-pressed vertically movable clamping arms movable into and out of engagement with the top end of the bottle, a stationary segmental cam for raising said clamping arms, means for applying a coating of adhesive material to the surfaces of the bottles to be labeled, a label receptacle mounted adjacent to the main rotary supporting member and forming a label-containing compartment, means for feeding labels contained in the compartment into position to engage the surfaces of the bottles to be labeled, a vertical spindle upon which the label receptacle is supported, a laterally movable bearing in which the last mentioned spindle is rotatively mounted, spring mechanism in engagement with the laterally movable spindle bearing for permitting and yieldingly resisting lateral movement of the spindle and label receptacle, a conical friction wheel fixed to the bottle-supporting spindle, a friction member adjustably mounted on the label receptacle supporting spindle and adapted to frictionally engage the conical friction member, and driving mechanism connected with the main rotary supporting member and with the label receptacle supporting spindle, for rotating the same simultaneously.

23. In a labeling machine, the combination of a main rotary supporting member, a series of upright bottle-supporting spindles rotatably mounted on the peripheral portion of the same, means for removably securing a bottle to be labeled in position upon each of such rotary spindles successively, means for applying a coating of adhesive material to the surfaces of the bottles, a series of label receptacles located adjacent to the main rotary supporting member and each forming a label containing compartment, means for feeding labels contained in said compartments into position to engage the surface of an article to be labeled, a vertical shaft rotatively mounted and forming a support for the label receptacles, a friction member mounted on said shaft, the outer peripheral surface portions of said friction member and the outermost labels contained in said receptacles being equal distances from the axial center of the label receptacle supporting shaft, a friction member fixed to each bottle-supporting spindle and each having a peripheral friction surface of the same diameter as the portion of the bottle to which a label is to be applied, the friction surfaces of said friction members being in engagement, means for rotating the main rotary supporting member, and means for rotating the label receptacle supporting shaft.

24. In a labeling machine, the combination of a main rotary supporting member, a series of bottle-supporting spindles mounted on the same and each adapted to form a rotative support for an article to be labeled, means for applying adhesive material in position to secure a label to the article to be labeled, a vertical shaft rotatively mounted in parallel relation to the axis of rotation of the main rotary supporting member, a head mounted on said shaft and adapted to be raised and lowered to different positions longitudinally of the shaft, a series of receptacles mounted on said head and each forming a label-containing compartment, means for feeding labels contained in such compartments into position to engage the surface of an article to be labeled, means for rotating the main supporting member, and means for rotating said vertical shaft and thereby the label receptacles.

25. In a labeling machine, the combination of a main rotary supporting member, a series of bottle-supporting spindles mounted on the same and each adapted to form a rotative support for an article to be labeled, means for applying adhesive material in position to secure a label to the article to be labeled, a vertical shaft rotatively mounted in parallel relation to the axis of rotation of the main rotary supporting member, a head upon the shaft, spring-pressed, laterally movable receptacle-supporting members mounted on the head, a series of receptacles each mounted on and pivotally connected with one of said laterally movable receptacle-supporting members and each forming a label-containing compartment, means for feeding labels contained in said compartments into position to engage the surface of an article to be labeled, and means for rotating the main rotary supporting member and said vertical shafts.

26. In a labeling machine, the combination of a main rotary supporting member, a series of bottle-supporting spindles mounted on the same and each adapted to form a rotative support for an article to be labeled, means for applying adhesive material in position to secure a label to the article to be labeled, a vertical shaft rotatively mounted in parallel relation to the axis of rotation of the main rotary supporting member, a head mounted on said shaft, a series of receptacles each pivotally mounted and connected and rotatable with said head and movable laterally with respect to the head and each forming a label-containing compartment, means for limiting the pivotal movement of each label receptacle in one direction circumferentially of the head, spring mechanism adapted to permit and yieldingly resist the pivotal movements of the receptacles in an opposite direction, spring-pressed means for feeding labels contained in such compartments into position to engage the surface of an article to be labeled, means for rotating the main rotary supporting member, and means for rotating said vertical shaft and thereby the label receptacles.

27. In a labeling machine, the combination of a main rotary supporting member, a series of bottle-supporting spindles mounted on the same and each adapted to form a rotative support for an article to be labeled, means for applying adhesive material in position to secure a label to the article to be labeled, a vertical shaft rotatively mounted in parallel relation to the axis of rotation of the main rotary supporting member, a head mounted on said shaft and adapted to be raised and lowered to different positions longitudinally of the shaft, a series of receptacles each pivotally mounted and removably connected and rotatable with said head and movable laterally with respect to the head and each forming a label-containing compartment, means for limiting the pivotal movement of each label receptacle in one direction circumferentially of the head, spring mechanism adapted to permit and yieldingly resist the pivotal movements of the receptacles in an opposite direction, spring-pressed means for feeding labels contained in such compartments into position to engage the surface of an article to be labeled, means for rotating the main rotary supporting member, and means for rotating said vertical shaft and thereby the label receptacles.

28. In a labeling machine, the combination of a main rotary supporting member, a series of bottle-supporting spindles mounted on the same and each adapted to form a rotative support for an article to be labeled, means for applying adhesive material in position to secure a label to the article to be labeled, a vertical shaft rotatively mounted in parallel relation to the axis of rotation of the main rotary supporting member, a receptacle-supporting head upon the shaft, spring-pressed, laterally movable receptacle-supporting members mounted on the head, a series of receptacles each mounted on and pivotally connected with one of said laterally movable receptacle-supporting members and each forming a label-containing compartment, means for feeding labels contained in said compartments into position to engage the surface of an article to be labeled, means for limiting the pivotal movement of each receptacle in one direction, spring mechanism adapted to permit and yieldingly resist the pivotal movements of the receptacles in an opposite direction circumferentially of the head, and means for rotating the main rotary supporting member and said vertical shafts.

In testimony that I claim the foregoing as my invention I affix my signature in the presence of two witnesses, this 4th day of April A. D. 1913.

AUGUST TIESSE

Witnesses:
 EUGENE C. WANN,
 HARRY IRWIN CROMER.